United States Patent
Cole et al.

(10) Patent No.: US 12,454,512 B2
(45) Date of Patent: Oct. 28, 2025

(54) PROCESSES AND INTERMEDIATES FOR THE PREPARATION OF 2-(2,6-DICHLOROPHENYL)-1-[(1S,3R)-3-(HYDROXYMETHYL)-5-(3-HYDROXY-3-METHYLBUTYL)-1-METHYL-3,4-DIHYDROISOQUINOLIN-2(1H)-YL] ETHENONE

(71) Applicant: Eli Lilly and Company, Indianapolis, IN (US)

(72) Inventors: Kevin Paul Cole, Indianapolis, IN (US); Neil John Kallman, Indianapolis, IN (US); Nicholas Andrew Magnus, Carmel, IN (US)

(73) Assignee: ELI LILLY AND COMPANY, Indianapolis, IN (US)

(*) Notice: Subject to any disclaimer, the term of this patent is extended or adjusted under 35 U.S.C. 154(b) by 739 days.

(21) Appl. No.: 17/620,198

(22) PCT Filed: Jun. 11, 2020

(86) PCT No.: PCT/US2020/037186
§ 371 (c)(1),
(2) Date: Dec. 17, 2021

(87) PCT Pub. No.: WO2020/257043
PCT Pub. Date: Dec. 24, 2020

(65) Prior Publication Data
US 2022/0242826 A1    Aug. 4, 2022

Related U.S. Application Data

(60) Provisional application No. 62/862,805, filed on Jun. 18, 2019.

(51) Int. Cl.
*C07D 217/16* (2006.01)
(52) U.S. Cl.
CPC ................ *C07D 217/16* (2013.01)
(58) Field of Classification Search
None
See application file for complete search history.

(56) References Cited

U.S. PATENT DOCUMENTS

| | | | |
|---|---|---|---|
| 8,962,654 B2 * | 2/2015 | Beadle | A61P 25/18 514/307 |
| 2014/0357664 A1 * | 12/2014 | Beadle | A61P 25/16 514/307 |

FOREIGN PATENT DOCUMENTS

| | | | |
|---|---|---|---|
| WO | 2014193781 A1 | | 12/2014 |
| WO | 2017/070068 | * | 4/2017 |
| WO | 2017070068 A1 | | 4/2017 |

OTHER PUBLICATIONS

Hao, J Med Chem, 2019, vol. 62, 8711-8732. (Year: 2019).*
Hao, J. et al., "Synthesis and Pharmacological Characterization of 2-(2,6-Dichlorophenyl)-1-((1 S , 3 R)-5-(3-hydroxy-3-methylbutyl)-3-(hydroxymethyl)-1-methyl-3,4-dihydroisoquinolin-2(1 H )-yl)ethan-1-one (LY3154207), a Potent, Subtype Selective, and Orally Available Positive Allosteric Modular of the Human Dopam," Journal of Medicinal Chemistry, 2019, pp. 8711-8732, vol. 62, No. 19.
Magnus, N.A. et al., "Diastereoselective Pictet-Spengler Based Synthesis of a Chrial Tetrahydroisoquinoline D1 Potentiator," The Journal of Organic Chemistry, 2020, pp. 7510-7514, vol. 85, No. 11.
International Search Report of PCT/US2020/037186 (filed by Eli Lilly and Company on Jun. 11, 2020) dated Sep. 16, 2020, issued by the European Patent Office.
Written Opinion of the International Searching Authority of PCT/US2020/037186 (filed by Eli Lilly and Company on Jun. 11, 2020) dated Sep. 16, 2020, issued by the European Patent Office.

* cited by examiner

Primary Examiner — D Margaret M Seaman
(74) Attorney, Agent, or Firm — Dan L. Wood

(57) ABSTRACT

The embodiments of the present invention provide processes and intermediates for the preparation of D1 PAM I: Formula (I).

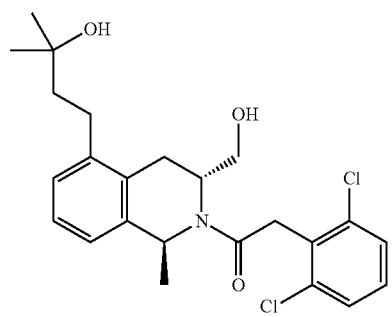

9 Claims, No Drawings

PROCESSES AND INTERMEDIATES FOR THE PREPARATION OF 2-(2,6-DICHLOROPHENYL)-1-[(1S,3R)-3-(HYDROXYMETHYL)-5-(3-HYDROXY-3-METHYLBUTYL)-1-METHYL-3,4-DIHYDROISOQUINOLIN-2(1H)-YL]ETHENONE

The embodiments of the present invention relate to the fields of pharmaceutical chemistry and synthetic organic chemistry, and provide processes and key intermediates for the synthesis of 2-(2,6-dichlorophenyl)-1-[(1S,3R)-3-(hydroxymethyl)-5-(3-hydroxy-3-methylbutyl)-1-methyl-3,4-dihydroisoquinolin-2(1H)-yl]ethanone, a D1 receptor positive allosteric modulator (D1 PAM), and compositions thereof.

2-(2,6-dichlorophenyl)-1-[(1S,3R)-3-(hydroxymethyl)-5-(3-hydroxy-3-methylbutyl)-1-methyl-3,4-dihydroisoquinolin-2(1H)-yl]ethanone is a dopamine D1 receptor Positive Allosteric Modulator (D1 PAM), and represents a potential first-in-class treatment for dementias and other dopaminergic CNS disorders. 2-(2,6-dichlorophenyl)-1-[(1S,3R)-3-(hydroxymethyl)-5-(3-hydroxy-3-methylbutyl)-1-methyl-3,4-dihydroisoquinolin-2(1H)-yl]ethanone (CAS Registry No. 1638667-79-4) will be referred to herein in some instances as D1 PAM I, and can be structurally represented as:

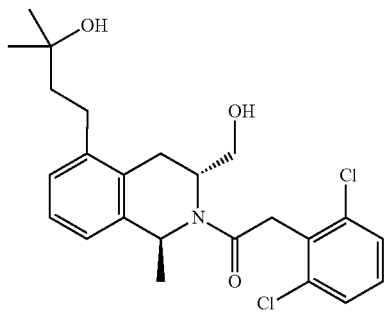 [SMILES: C[C@H]1c2cccc(CCC(C)(C)O)c2C[C@H](CO)N1C(=O)Cc1c(Cl)cccc1Cl]

(I)

Useful forms of D1 PAM I include a crystalline form (See WO 2017/070068), and a co-crystalline form comprising 2-(2,6-dichlorophenyl)-1-[(1S,3R)-3-(hydroxymethyl)-5-(3-hydroxy-3-methylbutyl)-1-methyl-3,4-dihydroisoquinolin-2(1H)-yl]ethanone and 4-hydroxybenzoic acid (CAS Registry No. 1638669-32-5) (See WO 2014/193781). As a positive allosteric modulator, also called a "potentiator" of the dopamine D1 receptor subtype, D1 PAM I is highly selective for D1. D1 PAM I shows very weak direct agonism of the D1 receptor, and is active only in the presence of dopamine, and believed to be dependent on endogenous tone and subject to normal feedback control. Thus, D1 PAM I represents an innovative pharmacological agent and approach to modulating D1 signaling pathways in Parkinson's Disease, Alzheimer's' Disease, and other dopaminergic CNS disorders where D1 signaling may be deficient.

Methods of making D1 PAM I are described in WO 2014/193781, for instance in Examples 1 and 2. An 11 step synthetic route for the preparation of D1 PAM I has been disclosed previously in U.S. Pat. No. 8,962,654, as shown below in Scheme 1. The overall yield of D1 PAM I starting with commercially available 2-bromo-D-phenylalanine via the route described in Scheme 1 below is about 17% over all 11 steps. Thus, improvements in the synthesis of D1 PAM I could provide substantial and varied benefits.

Scheme 1

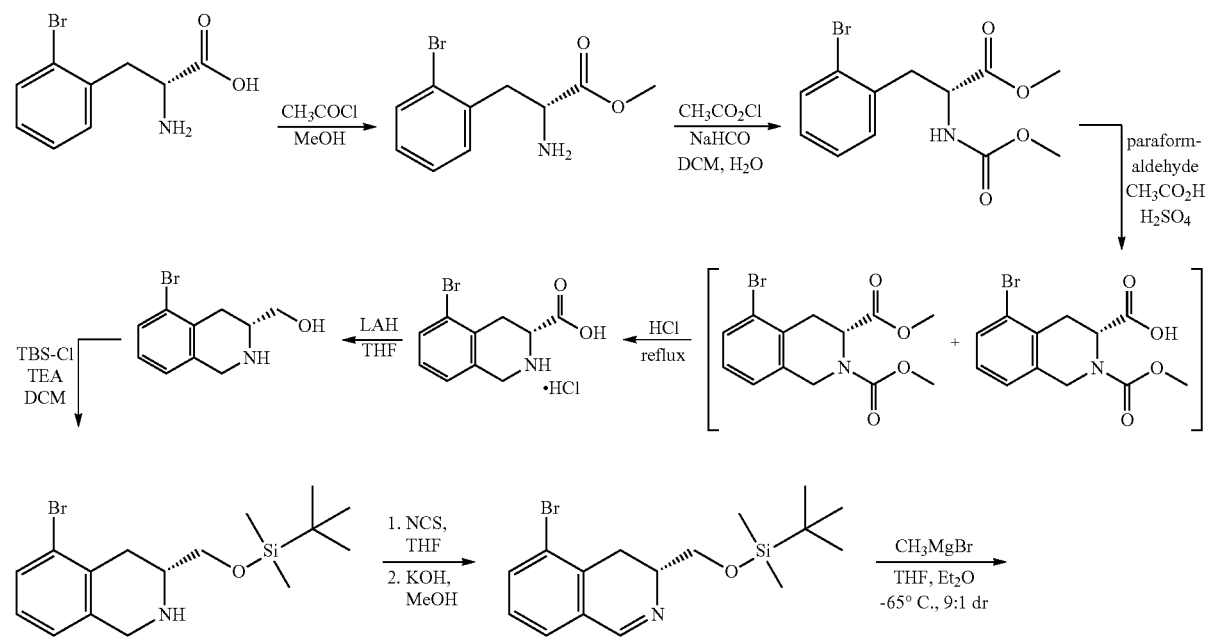

-continued

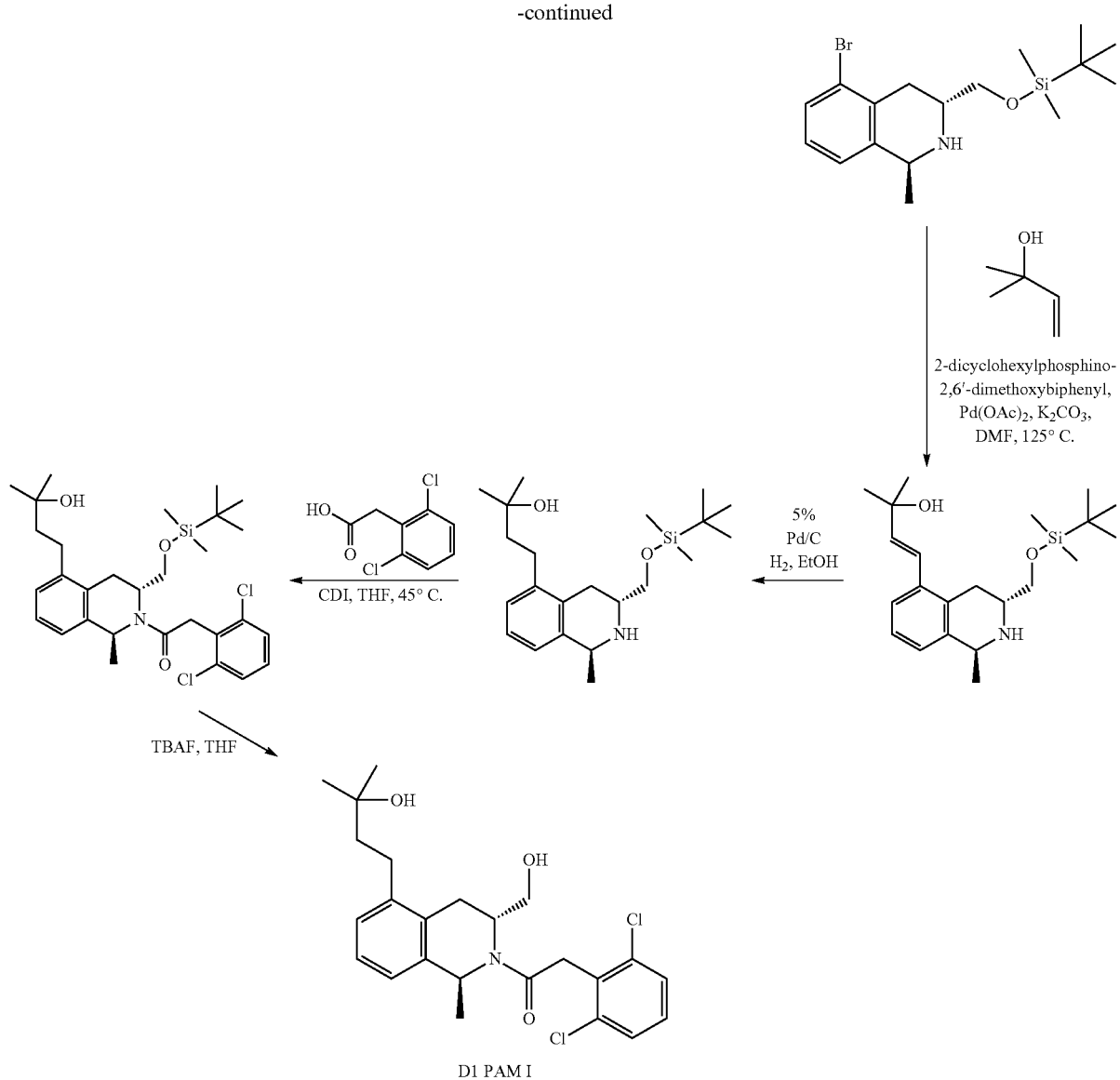

Synthetic chemistry process routes may be redesigned or revised aiming to achieve various advantages, including for example: improved yields, obtaining crystalline products, decreasing impurity profiles, utilizing commercially available intermediates, enhancing or improving enantioselectivity and/or stereoselectivity and/or diastereoselectivity, minimizing the number of synthetic steps needed, reducing the inputs required and/or the by-products produced, or any useful combination of such improvements, to achieve important real-world outcomes including decreased costs, providing less resource intensive processes, and facilitating efficient production. Improved methods of making D1 PAM I are needed which may achieve one or more of these aims.

SUMMARY

The embodiments of the present invention provide processes for the preparation of 2-(2,6-dichlorophenyl)-1-[(1S, 3R)-3-(hydroxymethyl)-5-(3-hydroxy-3-methylbutyl)-1-methyl-3,4-dihydroisoquinolin-2(1H)-yl]ethenone and/or compositions thereof, and particularly useful intermediates for use in these processes.

In one embodiment the present invention provides a process for preparing a compound of the formula:

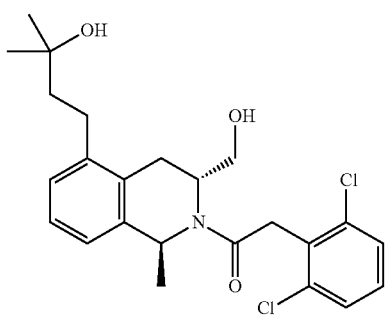 [SMILES: C[C@H]1c2cccc(CCC(C)(C)O)c2C[C@H](CO)N1C(=O)Cc1c(Cl)cccc1Cl]

comprising the steps of:
i.) Sequential treatment of (R)-2-bromophenylalanine with a reducing agent and iodine; and subsequent treatment with a mild mineral base and an alkyl carbonate to obtain (4R)-4-[(2-bromophenyl)methyl]oxazolidin-2-one;
ii.) Treatment of (4R)-4-[(2-bromophenyl)methyl]oxazolidin-2-one with a sodium arylsulfinate and acetaldehyde to obtain (4R)-3-[(1S)-1-(arylsulfonyl)ethyl]-4-[(2-bromophenyl)methyl]oxazolidin-2-one;
iii.) Optionally crystallizing the (4R)-3-[(1S)-1-(arylsulfonyl)ethyl]-4-[(2-bromophenyl)methyl]oxazolidin-2-one;
iv.) Optionally verifying the stereochemistry of (4R)-3-[(1S)-1-(arylsulfonyl)ethyl]-4-[(2-bromophenyl)methyl]oxazolidin-2-one by single crystal X-ray analysis;
v.) Pictet-Spengler cyclization of (4R)-3-[(1S)-1-(arylsulfonyl)ethyl]-4-[(2-bromophenyl)methyl]oxazolidin-2-one with a transition metal halide, to obtain (5S,10aR)-9-bromo-5-methyl-1,5,10,10a-tetrahydro-3H-oxazolo[3,4-b]isoquinolin-3-one;
vi.) Optionally crystallizing the (5S,10aR)-9-bromo-5-methyl-1,5,10,10a-tetrahydro-3H-oxazolo[3,4-b]isoquinolin-3-one;
vii.) Optionally verifying the stereochemistry of (5S, 10aR)-9-bromo-5-methyl-1,5,10,10a-tetrahydro-3H-oxazolo[3,4-b]isoquinolin-3-one by single crystal X-ray analysis; viii.) Heck coupling of (5S,10aR)-9-bromo-5-methyl-1,5,10,10a-tetrahydro-3H-oxazolo[3,4-b]isoquinolin-3-one with 2-methyl-3-buten-2-ol to obtain (E)-4-((1S,3R)-3-(hydroxymethyl)-1-methyl-1,2,3,4-tetrahydroisoquinolin-5-yl)-2-methylbut-3-en-2-ol;
ix.) Optionally crystallizing the (E)-4-((1S,3R)-3-(hydroxymethyl)-1-methyl-1,2,3,4-tetrahydroisoquinolin-5-yl)-2-methylbut-3-en-2-ol;
x.) Reduction of (E)-4-((1S,3R)-3-(hydroxymethyl)-1-methyl-1,2,3,4-tetrahydroisoquinolin-5-yl)-2-methylbut-3-en-2-ol under hydrogenation conditions to obtain 4-[(1S,3R)-3-(hydroxymethyl)-1-methyl-1,2,3,4-tetrahydroisoquinolin-5-yl]-2-methylbutan-2-ol;
xi.) Optionally crystallizing 4-[(1S,3R)-3-(hydroxymethyl)-1-methyl-1,2,3,4-tetrahydroisoquinolin-5-yl]-2-methylbutan-2-ol;
xii.) Coupling of 4-[(1S,3R)-3-(hydroxymethyl)-1-methyl-1,2,3,4-tetrahydroisoquinolin-5-yl]-2-methylbutan-2-ol with 2,6-dichlorophenylacetic acid in the presence of a coupling agent for amide synthesis and a non-nucleophilic organic base to obtain 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone;
xiii.) Optionally crystallizing 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone; and
xiv.) Treating 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone with 4-hydroxybenzoic acid to obtain a co-crystal of 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone with 4-hydroxybenzoic acid.

Preferably the reactions in this process are performed using flow reaction methodology.

In another embodiment the present invention provides a process for preparing a compound of the formula:

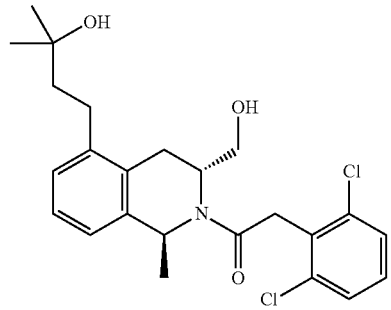

comprising the steps of:
i.) Treatment of (S)-(+)-benzyl glycidyl ether and 1,3-dibromobenzene with a metal base to obtain (2S)-1-benzyloxy-3-(2,6-dibromophenyl)propan-2-ol;
ii.) Treatment of (2 S)-1-benzyloxy-3-(2,6-dibromophenyl)propan-2-ol with an aryl sulfonyl chloride in the presence of an organic base to obtain [(1S)-1-(benzyloxymethyl)-2-(2,6-dibromophenyl)ethyl] aryl sulfonate;
iii.) Treatment of [(1S)-1-(benzyloxymethyl)-2-(2,6-dibromophenyl)ethyl] arylsulfonate with (S,E)-N-ethylidene-2-methylpropane-2-sulfinamide in the presence of an organometallic base; and subsequent treatment with toluenesulfonic acid monohydrate to obtain (1S,3R)-3-(benzyloxymethyl)-5-bromo-1-methyl-1,2,3,4-tetrahydroisoquinoline 4-methylbenzenesulfonic acid;
iv.) Optionally crystallizing (1S,3R)-3-(benzyloxymethyl)-5-bromo-1-methyl-1,2,3,4-tetrahydroisoquinoline 4-methylbenzenesulfonic acid;
v.) Freebasing (1S,3R)-3-(benzyloxymethyl)-5-bromo-1-methyl-1,2,3,4-tetrahydroisoquinoline 4-methylbenzenesulfonic acid with a non-nucleophilic mineral base and subsequent debenzylation to obtain [(1S,3R)-5-bromo-1-methyl-1,2,3,4-tetrahydroisoquinolin-3-yl]methanol;
vi.) Heck coupling of obtain [(1S,3R)-5-bromo-1-methyl-1,2,3,4-tetrahydroisoquinolin-3-yl]methanol with 2-methylbut-3-en-2-ol to obtain (E)-4-[(1S,3R)-3-(hydroxymethyl)-1-methyl-1,2,3,4-tetrahydroisoquinolin-5-yl]-2-methyl-but-3-en-2-ol;
vii.) Reduction of (E)-4-((1S,3R)-3-(hydroxymethyl)-1-methyl-1,2,3,4-tetrahydroisoquinolin-5-yl)-2-methylbut-3-en-2-ol under hydrogenation conditions to obtain 4-[(1S,3R)-3-(hydroxymethyl)-1-methyl-1,2,3,4-tetrahydroisoquinolin-5-yl]-2-methylbutan-2-ol;
viii.) Optionally crystallizing 4-[(1S,3R)-3-(hydroxymethyl)-1-methyl-1,2,3,4-tetrahydroisoquinolin-5-yl]-2-methylbutan-2-ol;
ix.) Coupling of 4-[(1S,3R)-3-(hydroxymethyl)-1-methyl-1,2,3,4-tetrahydroisoquinolin-5-yl]-2-methylbutan-2-ol with 2,6-dichlorophenylacetic acid in the presence of 2-chloro-4,6-dimethoxy-1,3,5-triazine and a non-nucleophilic organic base to obtain 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone;
x.) Optionally crystallizing 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone; and xi.) Treating 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone with 4-hydroxybenzoic acid to obtain a co-crystal of 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone with 4-hydroxybenzoic acid.

Preferably in this process the coupling agent for amide synthesis is 2-chloro-4,6-dimethoxy-1,3,5-triazine. Preferably the reactions in this process are performed using flow reaction methodology.

In another embodiment the present invention provides a process for preparing the compound

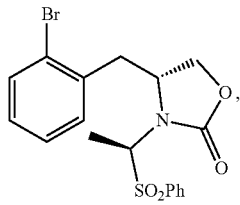

comprising:
i.) Treatment of (4R)-4-[(2-bromophenyl)methyl]oxazolidin-2-one with sodium benzenesulfinate, HCO₂H, and acetaldehyde; and
ii.) Optionally crystallizing the single diastereomer to obtain (4R)-3-[(1S)-1-(benzenesulfonyl)ethyl]-4-[(2-bromophenyl)methyl]oxazolidin-2-one.

In another embodiment the present invention provides a process for preparing the compound

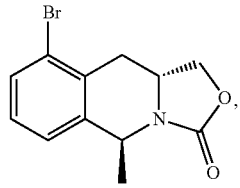 [SMILES: C[C@H]1c2cccc(Br)c2C[C@@H]2COC(=O)N21]

comprising a diastereoselective Pictet-Spengler cyclization of (4R)-3-[(1S)-1-(benzenesulfonyl)ethyl]-4-[(2-bromophenyl)methyl]oxazolidin-2-one with ZrCl₄ to obtain (5S, 10aR)-9-bromo-5-methyl-1,5,10,10a-tetrahydro-3H-oxazolo[3,4-b]isoquinolin-3-one.

Preferably wherein the above process for preparing the compound

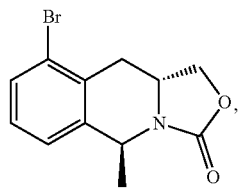 [SMILES: C[C@H]1c2cccc(Br)c2C[C@@H]2COC(=O)N21]

achieves a diastereomeric ratio greater than 50:1.

In another embodiment the present invention provides a process for preparing the compound

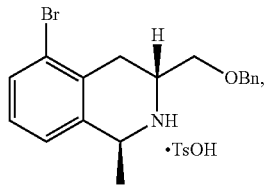

comprising:
i.) Treatment of [(1S)-1-(benzyloxymethyl)-2-(2,6-dibromophenyl)ethyl] 4-methylbenzenesulfonate and with n-butyllithium under continuous flow conditions and under cryogenic conditions to obtain [2-[(2S)-3-benzyloxy-2-(p-tolylsulfonyloxy)propyl]-3-bromo-phenyl]lithium
ii.) Treatment of [2-[(2S)-3-benzyloxy-2-(p-tolylsulfonyloxy)propyl]-3-bromo-phenyl]lithium with (S,E)-N-ethylidene-2-methylpropane-2-sulfinamide under continuous flow conditions;
iii.) Cleavage of the chiral sulfonamide auxiliary with HCl under continuous flow conditions;
iv.) Treatment of the cleaved product with an inorganic base to provide (1S,3R)-3-(benzyloxymethyl)-5-bromo-1-methyl-1,2,3,4-tetrahydroisoquinoline; and
v.) Treatment of (1S,3R)-3-(benzyloxymethyl)-5-bromo-1-methyl-1,2,3,4-tetrahydroisoquinoline with 4-toluenesulfonic acid to provide (1S,3R)-3-(benzyloxymethyl)-5-bromo-1-methyl-1,2,3,4-tetrahydroisoquinoline 4-toluenesulfonic acid.

In other embodiments the present invention provides compounds useful for the synthesis of D1 PAM I.

In another embodiment the present invention provides the compound

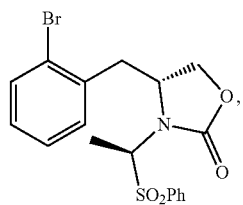

which can be named as (4R)-3-[(1S)-1-(benzenesulfonyl)ethyl]-4-[(2-bromophenyl)methyl]oxazolidin-2-one.
Preferably this compound is crystalline.
In another embodiment the present invention provides

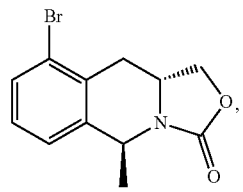 [SMILES: C[C@H]1c2cccc(Br)c2C[C@@H]2COC(=O)N21]

which can be named as (5S,10aR)-9-bromo-5-methyl-1,5,10,10a-tetrahydro-3H-oxazolo[3,4-b]isoquinolin-3-one.
Preferably this compound is crystalline.

In another embodiment the present invention provides

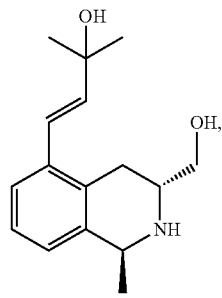 [SMILES: C[C@@H]1N[C@@H](CO)Cc2c(/C=C/C(C)(C)O)cccc21]

which can be named as (E)-4-((1S,3R)-3-(hydroxymethyl)-1-methyl-1,2,3,4-tetrahydroisoquinolin-5-yl)-2-methylbut-3-en-2-ol. Preferably this compound is crystalline.

In another embodiment the present invention provides

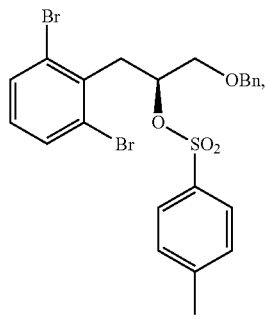 [SMILES: Cc1ccc(S(=O)(=O)O[C@H](COCc2ccccc2)Cc2c(Br)cccc2Br)cc1]

which can be named as [(1S)-1-(benzyloxymethyl)-2-(2,6-dibromophenyl)ethyl] 4-methylbenzenesulfonate. Preferably this compound is crystalline.

In another embodiment the present invention provides

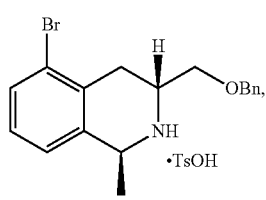

which can be named as (1S,3R)-3-(benzyloxymethyl)-5-bromo-1-methyl-1,2,3,4-tetrahydroisoquinoline 4-methylbenzenesulfonic acid. Preferably this compound is crystalline.

In another embodiment the present invention provides

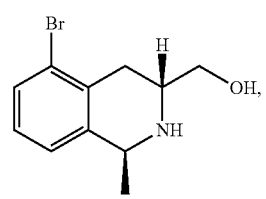

which can be named as [(1S,3R)-5-bromo-1-methyl-1,2,3,4-tetrahydroisoquinolin-3-yl]methanol. Preferably this compound is crystalline.

In another embodiment the present invention provides

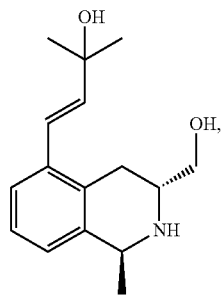 [SMILES: C[C@@H]1N[C@@H](CO)Cc2c(/C=C/C(C)(C)O)cccc21]

which can be named as (E)-4-((1S,3R)-3-(hydroxymethyl)-1-methyl-1,2,3,4-tetrahydroisoquinolin-5-yl)-2-methylbut-3-en-2-ol. Preferably this compound is crystalline.

DETAILED DESCRIPTION

The reactions described herein may be performed via standard techniques known to the skilled artisan by employing routine glassware or may be performed on pilot and/or production scale in equipment designed for such transformations. Further, each of these reactions described may be executed via either a batch process or flow reaction methodology. The term "batch process" as used herein refers to a process in which raw materials are combined in a reactor or vessel and product is removed at the end of the reaction. The term "continuous processing" or "flow reaction" as used herein refers to a process in which there is a continuous inflow of raw materials and outflow of product. Such continuous processing enables a platform where the final product may be synthesized by a fully continuous train of operations starting from initial starting materials.

Individual isomers, enantiomers, and diastereomers may be separated or resolved by one of ordinary skill in the art at any convenient point in the synthesis of compounds of the present invention by methods such as selective crystallization techniques or chiral chromatography (See for example, J. Jacques, et al., "*Enantiomers, Racemates, and Resolutions*", John Wiley and Sons, Inc., 1981, and E. L. Eliel and S. H. Wilen, "*Stereochemistry of Organic Compounds*", Wiley-Interscience, 1994).

Additionally, certain intermediates described in the following preparations may contain one or more nitrogen protecting groups. The variable protecting group may be the same or different in each occurrence depending on the particular reaction conditions and the particular transformations to be performed. The protection and deprotection conditions are well known to the skilled artisan and are described in the literature (See for example "*Greene's Protective Groups in Organic Synthesis*", Fourth Edition, by Peter G. M. Wuts and Theodora W. Greene, John Wiley and Sons, Inc. 2007).

The abbreviations listed below when used herein are defined as follows: "Å" means angstrom or angstroms. "AcOH" means acetic acid. "Bn" means benzyl; "nBuLi" means n-butyllithium. "CAS No." means Chemical Abstracts Registry number. "CDI" means carbonyl diimidazole. "D1 PAM I" as used herein may include co-crystalline forms comprising 2-(2,6-dichlorophenyl)-1-[(1S,3R)-3-(hydroxymethyl)-5-(3-hydroxy-3-methylbutyl)-1-methyl-3,4-dihydroisoquinolin-2(1H)-yl]ethanone and 4-hydroxybenzoic acid. "DCM" means dichloromethane. "DIPEA" means diisopropylethylamine. "DMSO" means dimethyl sulfoxide (perdeuterated [$d_6$] if used for NMR). "dr" means diastereomeric ratio. "esd" means estimated standard deviation. "EtOAc" means ethyl acetate. "EtOH" means ethanol or ethyl alcohol. "HPLC" means high performance liquid chromatography. "h" means hour or hours. "HRMS (ESI+)" means High-resolution electrospray ionization mass spectrometry in positive ionization mode. "LAH" means lithium aluminum hydride. "LCMS" means liquid chromatography mass spectrometry. "LDA" means lithium diisopropylamide. "MeOH" means methanol or methyl alcohol. "min" means minutes. "MS" means mass spectrometry or mass spectrum. "NCS" means N-chlorosuccinimide. "NMR" means nuclear magnetic resonance. "OAc" means acetate. "PFA" means perfluoroalkoxy, in reference to tubing material. "PPTS" means pyridinium p-toluenesulfonate. "psig" means pounds per square inch gauge. "Q-NMR" means quantitative nuclear magnetic resonance. "RMS" means root-mean square. "RT" means room temperature/ambient temperature. "sec" means second or seconds as a unit of time. "TBAF" means tert-butyl ammonium fluoride. "TBS-Cl" means tert-butyldimethylsilyl chloride. "TEA" means triethylamine. "THF" means tetrahydrofuran. "tR" means retention time. "Ts" means 4-toluenesulfonate. "v/v" means volume to volume in a ratio. "w/w" means weight to weight in a ratio.

Improved routes for the preparation of D1 PAM I are provided below as Routes I and II, and other additional methods as provided below.

I. Epoxide route to prepare D1 PAM I.

Process 1

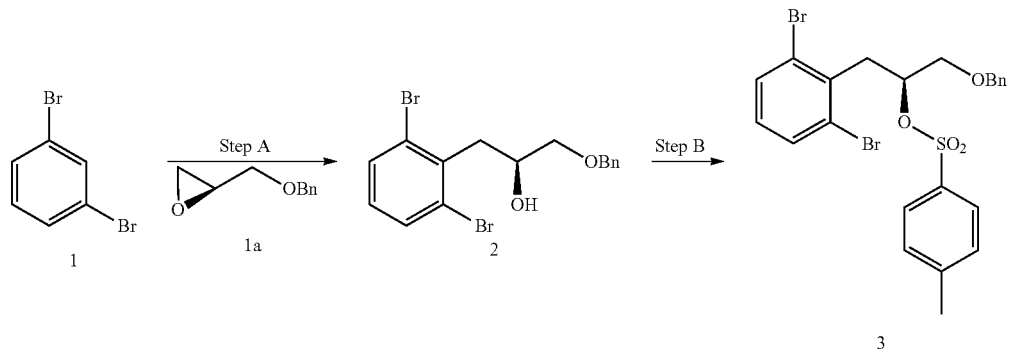

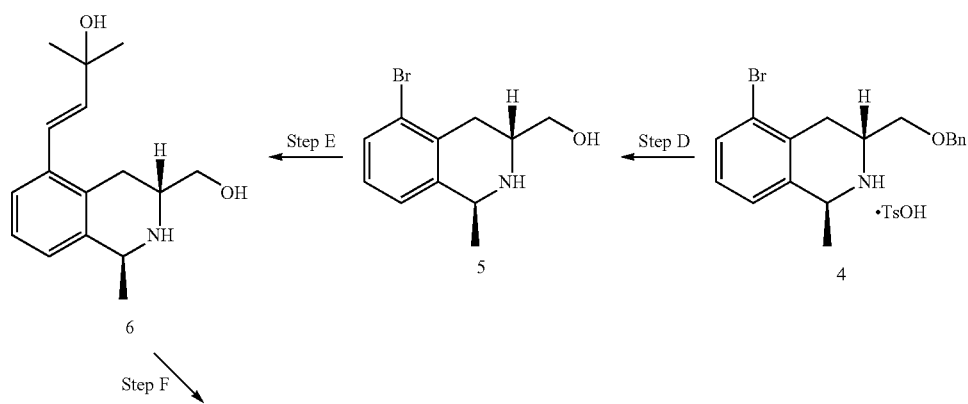

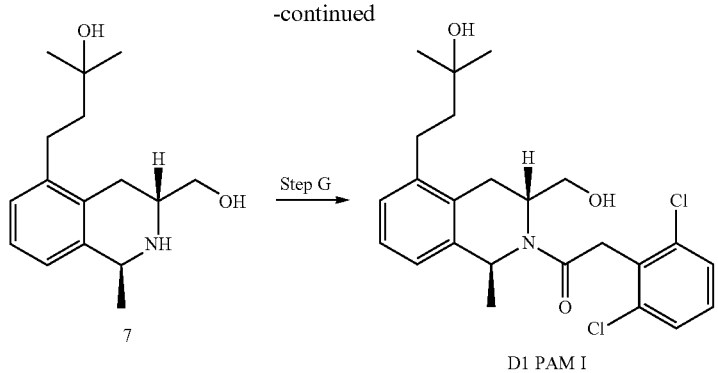

Process 1 depicts the synthesis of the compound D1 PAM I. Treatment of dibromobenzene 1 with a strong base such as LDA under cryogenic conditions, typically below −40° C., results in deprotonation of the aromatic proton in the 2-position, and subsequent reaction with commercially available epoxide 1a may furnish the alcohol 2. The transformation may be accomplished by stepwise generation of the aryl lithium species followed by exposure to 1a or, alternatively, by addition of a solution of LDA to a mixture of 1 and 1a. The reaction may be accomplished in batch mode or with use of continuous processing. Formation of tosylate 3 can be achieved by treatment of 2 with tosyl chloride in the presence of an appropriate base such as pyridine at temperatures between 20-80° C. Addition of EtOH and water to the reaction mixture results in crystallization of solid 3 directly from the reaction mixture. Treatment of tosylate 3 with an alkyllithium reagent, for example, nBuLi in ethereal solvent such as THF or 2-Me-THF, under cryogenic conditions such as −70° C. results in lithium-halogen exchange and formation of an aryllithium species. This transformation may be accomplished in small batches or continuous flow mode for production scale. The aryllithium species may be exposed to imine 3a, resulting in formation of a benzylic amine intermediate. Treatment of the crude solution of benzylic amine with acids such as aqueous HCl results in cleavage of the chiral sulfoxyl auxiliary and formation of an amine hydrochloride salt. Other strong acids may be used to achieve this cleavage. The crude solution is treated with an appropriate inorganic base such as aqueous sodium carbonate to increase the pH, allowing nucleophilic attack of the tosyl ester by the free amine, resulting in formation of the 6-membered ring present in 4. Aqueous workup can then purge various impurities and byproducts, and solvent exchange to a solvent like iso-propylacetate may be used. Exposure of the crude solution to acids such as TsOH-monohydrate gives formation of crystalline 4. Other acids such as HCl or naphthalene-1,5-disulfonic acid may be used in place of TsOH and enable isolation of crystalline solids. These crystallizations may reduce the amount of cis stereoisomer, which is typically present at about 10% as shown in Scheme 1 (see e.g. U.S. Pat. No. 8,962,654). Debenzylation may be accomplished by treatment of a solution of 4 in DCM with $BCl_3$, using co-solvents such as toluene or xylenes. The product 5 may then be isolated by extraction into acidic water, the organic phase discarded, and crystalline 5 produced by pH adjustment of the aqueous phase with a base such as aqueous NaOH. Subsequent Heck coupling under well-known conditions may give compound 6. Reduction to 7 under hydrogenation conditions and final amide coupling with 2,6-dichlorophenylacetic acid may give compound D1 PAM I.

Additionally, (S)-(−)-tert-butylsulfinamide may be treated with acetaldehyde in the presence of an acidic catalyst such as PPTS or Amberlyst-15, with or without a dehydrating reagent such as $MgSO_4$, to form imine 3a. Purification of 3a may be achieved by removal of the acidic catalyst by filtration or solvent exchange, precipitation, and filtration. Further purification may be achieved by vacuum distillation, maintaining the distillation pot temperature below about 80° C. to avoid decomposition of the crude 3a.

The process illustrated in Process 1 provides a route to D1 PAM I that is independent of D-2-Br-phenylalanine, which can be difficult to source and expensive. The starting materials are inexpensive and readily available. This process route has fewer steps than the Scheme 1 route, produces D1 PAM I in substantially higher overall yield than the methods disclosed in U.S. Pat. No. 8,962,654, with less waste. The route is projected to be significantly less expensive than the Scheme 1 route to manufacture bulk amounts of D1 PAM I and may be executed in a shorter amount of time. This route utilizes many crystalline control points along the way, allowing for efficient purification and isolation of intermediates and final compound.

A key step in this process route is depicted in Step C, which is best executed in continuous flow mode for scales above ~50 g due to the instability of the aryl lithium intermediate and challenges achieving adequate heat removal from large batch reactors. The aryl lithium intermediate has two bromine atoms that may be lithiated, but the process depicted in Process 1 stops at mono-lithiation; the intermediate has a built-in electrophile in the sulfonate ester, but undesired reactivity with this functional group can be avoided. The resulting chiral aryl lithium species is then reacted with the chiral sulfimide in batch or flow mode, which sets the second stereocenter. This method of tetrahydroisoquinoline formation is believed to be unprecedented in the literature, and gives independent control of both stereocenters adjacent to nitrogen. After reaction with the imine, the process stream may be immediately treated with acid to affect cleavage of the chiral auxiliary, which may also be accomplished in flow mode, in the same stream as the lithium halogen exchange and imine addition.

Detail of Intermediates in Process I, Step C:

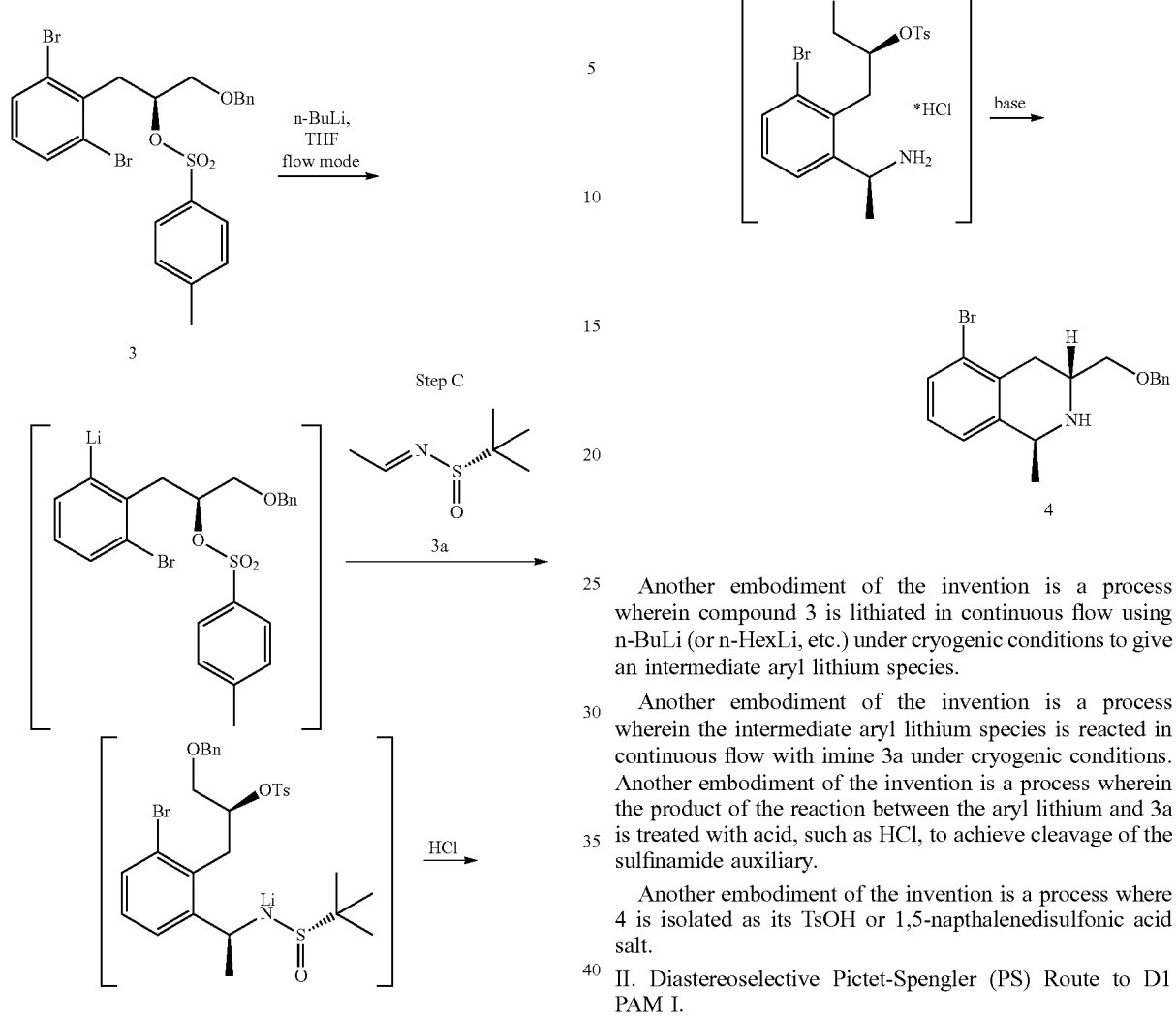

Another embodiment of the invention is a process wherein compound 3 is lithiated in continuous flow using n-BuLi (or n-HexLi, etc.) under cryogenic conditions to give an intermediate aryl lithium species.

Another embodiment of the invention is a process wherein the intermediate aryl lithium species is reacted in continuous flow with imine 3a under cryogenic conditions. Another embodiment of the invention is a process wherein the product of the reaction between the aryl lithium and 3a is treated with acid, such as HCl, to achieve cleavage of the sulfinamide auxiliary.

Another embodiment of the invention is a process where 4 is isolated as its TsOH or 1,5-napthalenedisulfonic acid salt.

II. Diastereoselective Pictet-Spengler (PS) Route to D1 PAM I.

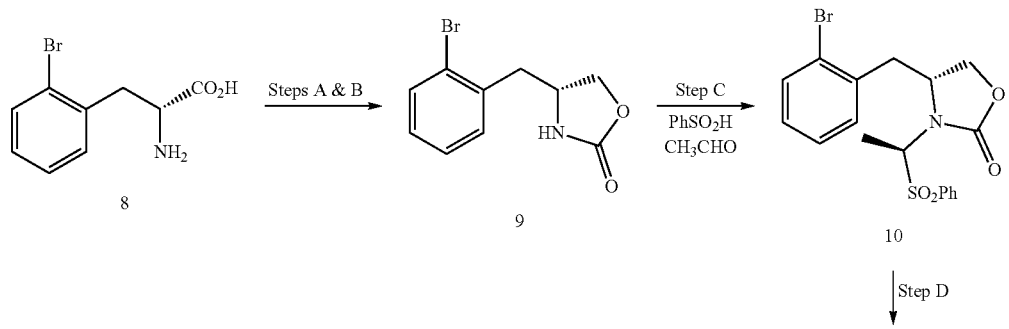

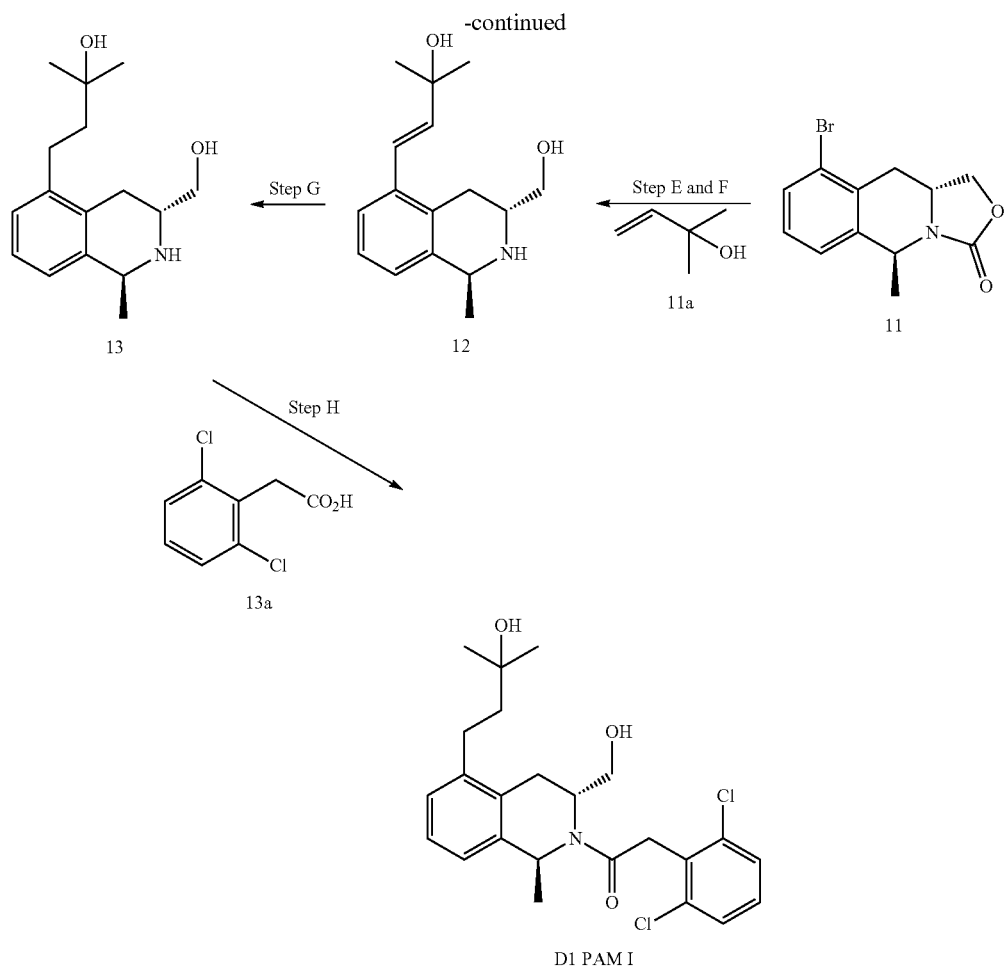

The invention illustrated in Process 2 is a highly diastereoselective Pictet-Spengler based synthetic process that produces the compound D1 PAM I in about 8 steps starting from R-2-bromophenylalanine 8 with excellent control of the necessary stereochemistry and in good to excellent yields for the individual steps. All of the intermediates in Process 2 may be isolated as crystalline solids that facilitate the control of chemical and stereochemical purity. R-2-Bromophenylalanine 8 may be converted into the novel oxazolidinone 9, in 2 steps. Preparation of an N-(phenylsulfonyl)alkyloxazolidinone, 10, in Process 2, Step C, is a dynamic kinetic resolution (DKR) driven by preferential crystallization of a single diastereomer of novel compound 10 (see, e.g., Pearson, W. H.; Lindbeck, A. C.; Kampf, J. W. *J. Am. Chem. Soc.* 1993, 115, 2622). Process 2, Step C, is believed to be the first example of a DKR with a chiral oxazolidinone to form an N-(phenylsulfonyl)alkyloxazolidinone as a single diastereomer. The absolute stereochemistry of 10 may be determined by single crystal X-Ray analysis. Process 2, Step D, is a highly diastereoselective and productive Pictet-Spengler cyclization to afford the novel chiral tetrahydroisoquinoline (THIQ) 11, which establishes the core structure of D1 PAM I. The absolute stereochemistry of 11 may be determined by single crystal X-Ray analysis. Pictet-Spengler cyclization type reactions are usually catalyzed by titanium(IV) chloride and other Lewis acids. After screening Lewis acids to promote the Process 2, Step D reaction, it was found that several are useful for this purpose (Table 1). In particular, zirconium(IV) chloride is desirable for promoting the Pictet-Spengler cyclization due to the very high diastereoselectivity and yield of the desired product 11, clean reaction profile, relatively lower equivalents required for high conversion, lack of color imparted to the reaction and product, and the relatively non-toxic and easy to remove by-product, zirconium oxide, and hydrates thereof. In general, higher dilution and lower temperature lead to increased diastereoselectivity in the Pictet-Spengler cyclization.

Some benefits of Process 2 relative to the route depicted in Scheme 1, and disclosed previously in U.S. Pat. No. 8,962,654, include: (a) starting from R-2-bromophenylalanine, the Pictet-Spengler (PS) route requires 8 synthesis steps to prepare D1 PAM I as compared to the existing route which involves about 11 synthesis steps. The Process 2 route transpires in about 56% overall yield, a significant improvement over the route disclosed previously as in Scheme 1. The Process 2 route is predicted to give about 75% reduction in cost and about a third to half of a reduction in cycle time to prepare D1 PAM I, relative to the route in Scheme 1. The synthetic route disclosed in Scheme 1 is predicted to take about 1.5 to 2 years to prepare D1 PAM I on scale, while the Process 2 route is predicted to take well under a year to prepare D1 PAM I on scale. The route disclosed in Scheme 1 uses protection group and cryogenic chemistry and has several intermediates that are not isolated due to poor physical or unstable properties while the Process 2 route has none of these unattractive features. The protection group and salt form of the advanced starting material in the route disclosed in Scheme 1 adds considerable mass that is effectively waste, to the extent that only about a third of the advanced starting material is comprised of atoms that will be a part of D1 PAM I. Conversely, the Process 2 route has a similarly advanced intermediate (the PS-product) that has none of the aforementioned issues, and about two thirds of the atoms are present in the desired compound D1 PAM I, which equates to highly substantial efficiency gains with regards to kilograms processed that result in D1 PAM I. In summary, the route disclosed in U.S. Pat. No. 8,962,654 and shown in Scheme 1 suffers from such a level of inefficiency and expense that it may not provide a viable commercial production route for D1 PAM I, while the efficiencies and relative low cost of the Process 2 route are believed to enable commercial production of D1 PAM I.

TABLE 1

Lewis acids that promote the Pictet-Spengler cyclization produce 11. Standard conditions: Lewis acid (2.5 eq.)/DCM (20 mL/g of intermediate 8)/2 h.

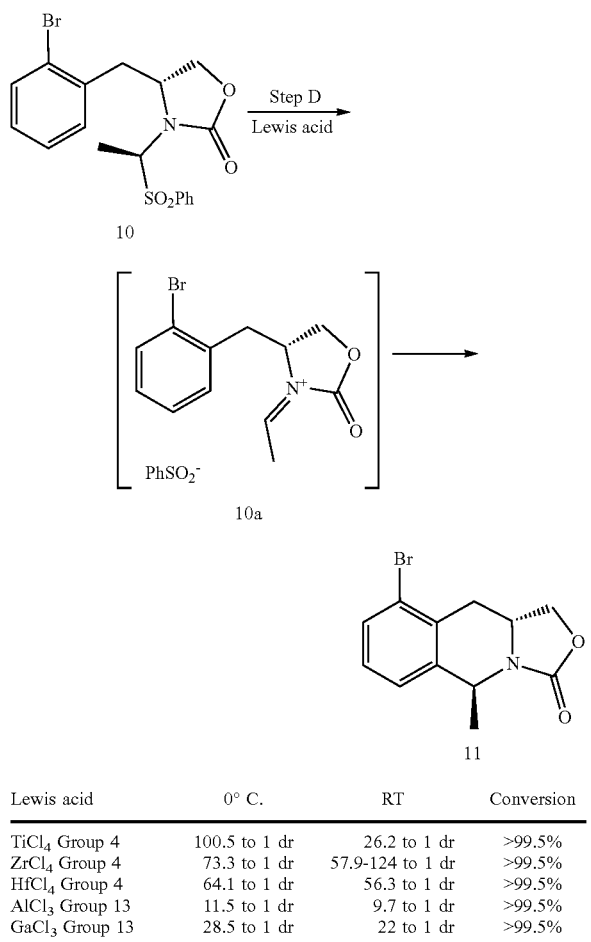

| Lewis acid | 0° C. | RT | Conversion |
|---|---|---|---|
| TiCl$_4$ Group 4 | 100.5 to 1 dr | 26.2 to 1 dr | >99.5% |
| ZrCl$_4$ Group 4 | 73.3 to 1 dr | 57.9-124 to 1 dr | >99.5% |
| HfCl$_4$ Group 4 | 64.1 to 1 dr | 56.3 to 1 dr | >99.5% |
| AlCl$_3$ Group 13 | 11.5 to 1 dr | 9.7 to 1 dr | >99.5% |
| GaCl$_3$ Group 13 | 28.5 to 1 dr | 22 to 1 dr | >99.5% |

In Process 2, Steps E and F, installation of the gem-dimethyl-tertiary alcohol side chain via a Heck coupling may be achieved with telescoping directly into the hydrolysis of the oxazolidinone, to generate the amino-alcohol 12. Hydrolysis of the oxazolidinone facilitates phosphine removal by enabling selective extractions and purification of the product 12 via crystallization. Process 2, Step G, depicts a mild and near quantitative hydrogenation of a double bond, and Process 2, Step H, is a selective amide coupling to afford D1 PAM I.

Preparations

The following Preparations of Process Intermediates further illustrate the invention and represent typical syntheses of various compounds. The reagents and starting materials are readily available or may be readily synthesized by one of ordinary skill in the art. It should be understood that the Preparations and Examples are set forth by way of illustration and not limitation, and that various modifications may be made by one of ordinary skill in the art.

LC-ES/MS is performed on an AGILENT® HP1100 liquid chromatography system. Electrospray mass spectrometry measurements (acquired in positive and/or negative mode) are performed on a Mass Selective Detector quadrupole mass spectrometer interfaced to the HP1100 HPLC. LC-MS conditions (low pH): column: PHENOMENEX® GEMINI® NX C18 2.1 mm×50 mm, 3.0µ; gradient: 5-100% B in 3 min, then 100% B for 0.75 min column temperature: 50° C.+/−10° C.; flow rate: 1.2 mL/min; Solvent A: deionized water with 0.1% HCOOH; Solvent B: ACN with 0.1% formic acid; wavelength 214 nm. Alternate LC-MS conditions (high pH): column: XTERRA® MS C18 columns 2.1×50 mm, 3.5 µm; gradient: 5% of solvent A for 0.25 min, gradient from 5% to 100% of solvent B in 3 min and 100% of solvent B for 0.5 min or 10% to 100% of solvent B in 3 min and at 100% of solvent B for 0.75 min; column temperature: 50° C.+/−10° C.; flow rate: 1.2 mL/min; Solvent A: 10 mM NH4HCO3 pH 9; Solvent B: ACN; wavelength: 214 nm.

NMR spectra are performed on a Bruker AVIII HD 400 MHz NMR Spectrometer, obtained as CDCl$_3$ or (CD$_3$)$_2$SO solutions reported in ppm, using residual solvent [CDCl$_3$, 7.26 ppm; (CD$_3$)$_2$SO, 2.05 ppm] as reference standard. When peak multiplicities are reported, the following abbreviations may be used: s (singlet), d (doublet), t (triplet), q (quartet), m (multiplet), br-s (broad singlet), dd (doublet of doublets), dt (doublet of triplets). Coupling constants (J), when reported, are reported in hertz (Hz). For Q-NMR, maleic acid is used as an internal standard.

Chiral HPLC is performed on an Agilent 1260 HPLC system, equipped with a PHENOMENEX® LUX-Cellulose-1 column: 4.6×250 mm, 1 mL/min flow rate, 35° C. column temperature, detection at 222 nm, mobile Phase: 40% (by volume) 20 mM NH$_4$HCO$_3$ containing 0.1% diethylamine in water: 60% (by volume) ACN, isocratic elution, run time at least 15 min, unless otherwise noted. t$_R$ is reported in min.

Achiral HPLC methods are performed on an Agilent 1260 HPLC system, equipped with a X-BRIDGE® C18 column, 3 mm×75 mm, 2,5 2.5µ; mobile phases: 5 mM NH$_4$CO$_3$, adjusted to pH 9 with NH4OH (A)/ACN (B); gradient (AB) 0 min (95/5)-11.25 min (5/95)-13.50 min (5/95)-13.61 min (95/5)-15.75 min (95/5); injection volume: 2 µL; column temperature: 40° C., Wavelength: 220 nm. Flow rate: 0.8 mL/min.

High resolution mass spectra (HRMS) are measured on a Thermo Scientific LTQ-ORBITRAP DISCOVERY™ system using electrospray ionization mode (ESI+) with a mass accuracy of less than 2 ppm, and an applied mass range from 75 to 1500 Da.

Process Intermediate 1

(2S)-1-benzyloxy-3-(2,6-dibromophenyl)propan-2-ol

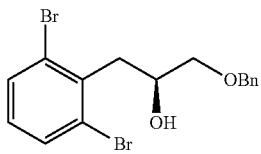 [SMILES: O[C@H](COCc1ccccc1)Cc1c(Br)cccc1Br]

Process 1, Step A: To a flask with nitrogen insertion is charged (S)-(+)-benzyl glycidyl ether (CAS #16495-13-9, Oakwood Chemical; 10.0 g, 61 mmol), 1,3-dibromobenzene (18.7 g, 79 mmol) and THF (60 mL) with stirring. The mixture is cooled in a bath of acetone and dry ice to an internal temperature of below −70° C. To a separate nitrogen-inerted flask is charged THF (40 mL) and DIPEA (11.1 mL) with stirring. The solution is cooled in a bath of a mixture of acetone and dry ice to an internal temperature of below 0° C. A 2.5 M solution of nBuLi in hexanes (30.5 mL, 76.3 mmol) is added gradually, keeping the internal temperature below 0° C. About 10 min after the nBuLi addition is completed, a double-tipped needle/cannula is used to gradually transfer the resulting LDA solution to the flask containing the epoxide and dibromide, which is maintained in the acetone/dry ice mixture at below −70° C. during the addition, over about 1 h, during which time a tan-colored slurry may form. The flask is maintained at below −70° C. for about 12 h. The solution is allowed to warm to about 0° C. and quenched with water (50 mL). The mixture is poured into a separate flask and partially concentrated under reduced pressure to a total volume of about 100 mL. Toluene (50 mL) is added, and the mixture is transferred to a separatory funnel. A solution of 5 M aqueous HCl (12.2 mL) is diluted with water (50 mL) and added to the toluene mixture to pH ~1. The yellow aqueous layer is removed and the organic phase is washed sequentially with water and saturated aqueous NaCl. The organic phase is dried over $Na_2SO_4$, filtered, and concentrated under reduced pressure to afford the crude title compound (Process 1, compound 2) as a yellow oil (30.36 g, Q-NMR assay=75.5% w/w, corrected yield=22.92 g, 94% yield). MS (m/z): 418 (M+NH$_4$).

Process Intermediate 2

[(1S)-1-(benzyloxymethyl)-2-(2,6-dibromophenyl)ethyl] 4-methylbenzenesulfonate

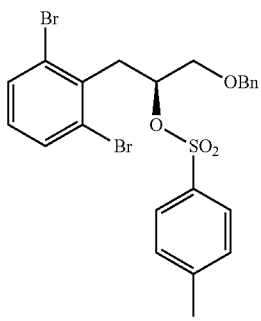 [SMILES: Cc1ccc(S(=O)(=O)O[C@H](COCc2ccccc2)Cc2c(Br)cccc2Br)cc1]

Process 1, Step B: In a flask under nitrogen, crude (2S)-1-benzyloxy-3-(2,6-dibromophenyl)propan-2-ol (211.6 g, 530 mmol) is dissolved in pyridine (424 mL), and 4-toluenesulfonyl chloride (121 g, 636 mmol) is added in two portions. The mixture is heated to 75° C. and stirred for 18 h. Additional 4-toluenesulfonyl chloride (25 g, 131 mmol) is added, and heating continued at 75° C. for 24 h. The reaction mixture is cooled to below 40° C. and transferred to a larger flask. Water (500 mL) is added and the mixture is stirred for 5 min. EtOH (1 L) is added, followed by seed crystals of [(1S)-1-(benzyloxymethyl)-2-(2,6-dibromophenyl)ethyl] 4-methylbenzenesulfonate (1 g) at 20° C. The mixture is stirred, and solids began to form in the flask. Additional EtOH (500 mL) is added and the mixture is stirred for 20 h. Water (500 mL) is added and the resulting slurry is cooled in an ice water bath to below 5° C. for 4 h. The resulting solids are isolated by filtration, washed with 1:1 (v/v) EtOH/water (400 mL), and cold EtOH (200 mL), to give a white solid. The collected solid is dried at 40° C. under vacuum to afford the title compound (Process 1, compound) as a nearly white solid (258.8 g, 88% yield). MS (m/z): 572 (M+NH$_4$).

Process Intermediate 3

(S,E)-N-ethylidene-2-methylpropane-2-sulfinamide

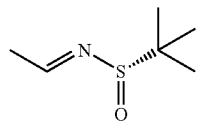

(S)-2-methylpropane-2-sulfinamide (50.0 g, 404 mmol) is added to a flask containing powdered MgSO$_4$ (97 g, 809 mmol) and DCM (500 mL). The resulting mixture is stirred at RT, and acetaldehyde (45 mL, 809 mmol) and PPTS (3.1 g, 12.1 mmol) are added. The mixture is stirred at RT for 24 h. Diatomaceous earth (25 g) is added to the slurry, and the solids are removed by filtration through a ceramic frit packed with diatomaceous earth; the filter cake is washed with additional DCM (3×100 mL). The filtrate is concentrated to about 50% volume under reduced pressure, hexanes (250 mL) are added, and the solution is concentrated to ~50% volume under reduced pressure. Hexanes are again added to the resulting concentrate and the solution is concentrated to near-dryness under reduced pressure, forming a yellow solid. Hexanes (250 mL) are added to the mixture, the solids are removed by filtration, and the resulting filtrate is concentrated under reduced pressure. The resulting residue is subjected to column chromatography over silica gel, eluting with 4:1 hexanes:EtOAc, to obtain the title compound (Process 1, compound 3a, 53.5 g, 90% yield determined by Q-NMR) after evaporation of the desired product fractions. The may be further purified by vacuum distillation (5 torr, pot temperature 75° C.) to give the title compound. MS (m/z): 148 (M+H).

Process Intermediate 4

(1S,3R)-3-(benzyloxymethyl)-5-bromo-1-methyl-1,2,3,4-tetrahydroisoquinoline 4-methylbenzenesulfonic acid

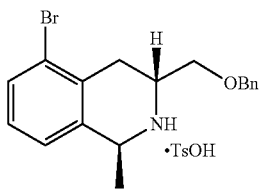

Process 1, Step C: A flask is charged with a magnetic stir bar, [(1S)-1-(benzyloxymethyl)-2-(2,6-dibromophenyl)ethyl] 4-methylbenzenesulfonate (50.0 g, 90.2 mmol) and 2-Me-THF (500 mL). The solution is heated to 50° C., and vacuum (230 torr) is applied in order to distill about 50 mL of the solvent. The flask is then cooled to RT and further cooled to an internal temperature of about −80° C. using a bath containing a combination of dry ice, acetone, and liquid nitrogen. A flask is charged with (S,E)-N-ethylidene-2-methylpropane-2-sulfinamide (14.6 g, 99.2 mmol) dissolved in 2-Me-THF (100 mL) with a stir bar and the resulting solution is cooled to below −70° C. using a bath of acetone/dry ice. A 2.5 M solution of nBuLi in hexanes (37.2 mL, 92.9 mmol) is added with stirring over about 150 sec. The solution is aged for about 3 min, and the imine solution is added using a ⅛ inch PFA tube and nitrogen pressure over 90 sec. The solution is stirred for 15 min, quenched by addition of a solution of AcOH (7.8 mL, 135 mmol) in MeOH (100 mL), and warmed to −15° C. A 12 M solution of aqueous HCl (14.8 mL, 180 mmol) is added, and the mixture is warmed to 30° C. with stirring for 2 h. A solution of Na$_2$CO$_3$ (28.7 g, 271 mmol) in water (400 mL) is prepared and added to the reaction mixture with stirring, warmed to 45° C., and heated at this temperature for 17 h. The resulting mixture is cooled to RT, diluted with EtOAc (about 50 mL), and the resulting layers are separated. The organic layer is washed with saturated aqueous NaCl (40 mL) and concentrated under reduced pressure. The resulting residue is dissolved in isopropylacetate (368 mL) and EtOH (23 mL). The resulting solution is heated to about 30° C. with stirring, and toluenesulfonic acid monohydrate (14.9 g, 85.7 mmol) is added. The resulting mixture is heated to 50° C. until all components dissolved. The solution is cooled to 40° C., seed crystals of (1S,3R)-3-(benzyloxymethyl)-5-bromo-1-methyl-1,2,3,4-tetrahydroisoquinoline 4-methylbenzenesulfonic acid (100 mg) are added, and a slurry begins to form. After 20 min, the temperature setting is reduced to 35° C. After 2 h, the resulting slurry is heated to 50° C. for 4 hours. The slurry temperature is reduced to 35° C. and held for 2 h. The resulting slurry mixture is cooled to RT with stirring for 15 h. The resulting slurry is cooled to 3° C. with an ice water bath, and the solids are collected by filtration. The filter cake is pressed dry with a spatula, washed with 1:1 isopropylacetate:n-heptane, and pressed dry again. The filter cake is dried under vacuum at 40° C. to afford the title compound (Process 1, compound 4, 33.0 g, 68% yield of E-isomer by NMR plus 3% cis-isomer by NMR) as a white solid. MS (m/z): 346 (M+H).

Process Intermediate 5

[(1S,3R)-5-bromo-1-methyl-1,2,3,4-tetrahydroisoquinolin-3-yl]methanol

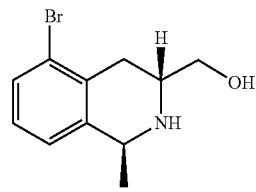

Process 1, Step D: (1S,3R)-3-(benzyloxymethyl)-5-bromo-1-methyl-1,2,3,4-tetrahydroisoquinoline 4-methylbenzenesulfonic acid (30.0 g, 58 mmol) is added to a flask containing a solution of K$_2$CO$_3$ (9.78 g, 70 mmol), water (120 mL), and toluene (120 mL). The mixture is stirred until the solids dissolve. The resulting layers are separated, and the aqueous layer is extracted with toluene (2×50 mL). The organic extracts are combined, washed with saturated aqueous NaCl (10 mL), and concentrated under reduced pressure to a volume of about 120 mL. The resulting concentrate is inerted with nitrogen while stirring and cooled in an ice/water bath. A 1 M solution of BCl$_3$ (96 mL, 96 mmol) is added, followed by chlorobenzene (100 mL). The resulting mixture is heated to 35° C. and DCM (100 mL) is added with stirring. The mixture is cooled to RT, MeOH (50 mL) and water (150 mL) are added, and the resulting layers are separated. The organic phase is extracted with water (2×50 mL). The combined aqueous extracts are washed with toluene (50 mL), and a 50% aqueous solution of NaOH is added gradually with stirring as a white solid formed and pH ~10 is reached. The resulting mixture is stirred at RT for 22 h. The resulting precipitate is isolated by filtration, washed with water (25 mL) and heptane (2×25 mL), and the collected solid is dried in a vacuum oven at 40° C. to afford the title compound (Process 1, compound 5) as a white solid (14.4 g, 97% yield). MS (m/z): 256 (M+H).

Alternative Procedure for Process Intermediate 5

Process 1, Step D: (5S,10aR)-9-bromo-5-methyl-1,5,10,10a-tetrahydro-3H-oxazolo[3,4-b]isoquinolin-3-one (2.2 g, 7.9 mmol, see Process Intermediate 8) is dissolved in EtOH (35.6 mL). A 50 wt % aqueous solution of NaOH (15.9 mL, 79.4 mmol) is added to the mixture, followed by heating to 70° C. for 17 h. The reaction mixture is filtered and the filtrate is concentrated under reduced pressure until a slurry begins to form. The slurry is heated to a gentle boil and EtOH is added until the mixture becomes homogeneous. The resulting mixture is cooled to RT with stirring for 2 h. The resulting solids are collected by filtration and washed with a 1:1 mixture of EtOH and water. A second crop of solids is formed in the filtrate, is collected by filtration, washed with water, and combined with the initial crop in a vacuum oven at 45° C. to give the title compound (Process 1, compound 5, 1.88 g, 92% yield). MS (m/z): 256 (M+H).

Process Intermediate 6

(E)-4-[(1S,3R)-3-(hydroxymethyl)-1-methyl-1,2,3,4-tetrahydroisoquinolin-5-yl]-2-methyl-but-3-en-2-ol

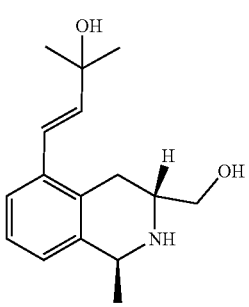 [SMILES: C[C@@H]1N[C@@H](CO)Cc2c(/C=C/C(C)(C)O)cccc21]

A 3-necked 250 mL round bottom flask with a magnetic stir bar, Claisen adapter, nitrogen inlet, thermocouple, heating mantle, air-cooled condenser, and rubber septum is evacuated and backfilled with nitrogen twice. [(1S,3R)-5-bromo-1-methyl-1,2,3,4-tetrahydroisoquinolin-3-yl]methanol (13.9 g, 54.3 mmol) is charged with toluene (120 mL). The mixture is sparged with nitrogen for 5 min, and 2-methylbut-3-en-2-ol (Alfa Aesar, 28.4 mL, 271.3 mmol) is added, followed by TEA (18.9 mL, 135.7 mmol). The resulting mixture is sparged with nitrogen for 5 min. Pd(OAc)$_2$ (244 mg, 1.1 mmol) and tri-ortho-tolylphosphine (661 mg, 2.2 mmol) are added, the nitrogen sparge is continued for an additional 5 minutes, and the resulting mixture is heated at 86° C. for 17.5 h. The reaction mixture is cooled to RT. The resulting solids are removed by filtration through a small pad of diatomaceous earth. The filtrate is concentrated to ½ volume under reduced pressure. The resulting residue is extracted with a solution of citric acid (13 g) in water (100 mL). The aqueous layer is washed with toluene (25 mL) and neutralized with 50% aqueous NaOH to pH 10. The resulting mixture is extracted with EtOAc (250 mL), the organic extracts are washed with saturated aqueous NaCl, and the organic extract is concentrated under reduced pressure. The resulting oil is dissolved in isopropyl acetate (56 mL) and heated to 35° C., during which time a slurry formed. Heptane (70 mL) is added and the slurry is cooled to RT, and additionally cooled in an ice water. The resulting solids are collected by filtration, washed with a 3:1 mixture of heptane/isopropyl acetate (30 mL), and dried under vacuum to yield to obtain the title compound (Process 1, compound 6; 10.8 g, 77% yield) as a pale yellow solid. MS (m/z): 262 (M+H).

Process Intermediate 7

4-[(1S,3R)-3-(hydroxymethyl)-1-methyl-1,2,3,4-tetrahydroisoquinolin-5-yl]-2-methyl-butan-2-ol

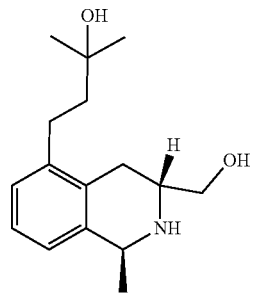 [SMILES: C[C@@H]1N[C@@H](CO)Cc2c(CCC(C)(C)O)cccc21]

A solution of (E)-4-[(1S,3R)-3-(hydroxymethyl)-1-methyl-1,2,3,4-tetrahydroisoquinolin-5-yl]-2-methyl-but-3-en-2-ol (10.3 g, 39.7 mmol) in EtOH (125 mL) is added to a 300 mL Parr® hydrogenation vessel containing 5% Pd/C catalyst (Johnson-Matthey, 505 mg, 59% water-wet). The system is pressurized with nitrogen, vented, pressurized with H$_2$ gas to 50 psig, and stirred at RT for 1 hour. The reaction mixture is vented and the system is inerted with nitrogen. The solids are removed by filtration and the resulting filtrate is concentrated to less than 50 mL under reduced pressure. Isopropyl acetate (100 mL) is added and the solution is concentrated to less than 50 mL under reduced pressure. Isopropyl acetate (100 mL) is added and the resulting mixture is concentrated under reduced pressure to less than 50 mL; additional isopropyl acetate (100 mL) is added, and the resulting mixture is heated to 40° C. for a few min. The mixture is concentrated under reduced pressure, and the resulting slurry is cooled to RT. The solids are collected by filtration and washed with a 1:1 mixture of heptane/isopropyl acetate (30 mL). The solids are dried under vacuum to obtain the title (Process 1, compound 7; 9.8 g, 94% yield) as a white solid. MS (m/z): 264 (M+H).

Process Intermediate 8

(4R)-4-[(2-bromophenyl)methyl]oxazolidin-2-one

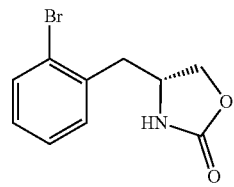 [SMILES: O=C1N[C@H](Cc2ccccc2Br)CO1]

Process 2, Steps A and B: A 60% dispersion of NaH in mineral oil (63 mg, 1.59 mmol) is added to tert-butyl (R)-(1-(2-bromophenyl)-3-hydroxypropan-2-yl)carbamate (CAS #944470-60-4, see, e.g., Journal of Medicinal Chemistry (2007), 50(13), 2990-3003; 0.5 g, 1.51 mmol) in THF (7.5 mL) is stirred at RT for 16.5 h. The reaction mixture is warmed to 55° C. for 45 min and cooled back to RT. The resulting solids are filtered and washed with heptane, followed by dissolving the solids in a mixture of DCM and aqueous NH$_4$Cl. The layers are separated, the organic phase is collected, and the aqueous phase extracted with DCM. The organic phases are combined, dried over Na$_2$SO$_4$, and concentrated under reduced pressure to give the title compound (Process 2, compound 9, 356 mg; 91%) as a white solid with 94.4% ee by chiral HPLC (Daicel CHIRALPAK® IC, 4.6 mm×150 mm, 5 u; mobile phases: 80/20 hexane/EtOH; injection volume: 2 μL; column temperature: 35° C.; wavelength: 220 nm.; flow rate: 1.0 mL/min). $^1$H NMR (600 MHz, DMSO-d$_6$): δ 2.86 (dd, J=13.7, 7.5 Hz, 1H), 2.98 (dd, J=13.7, 5.8 Hz, 1H), 4.12-4.04 (m, 1H), 4.02 (dd, J=8.4, 5.2 Hz, 1H), 4.27 (t, J=8.2 Hz, 1H), 7.18 (td, J=7.6, 1.8 Hz, 1H), 7.32 (td, J=7.4, 1.3 Hz, 1H), 7.37 (dd, J=7.6, 1.8 Hz, 1H), 7.59 (dd, J=8.0, 1.3 Hz, 1H), 7.83 (s, 1H). $^{13}$C{1H} NMR (151 MHz, DMSO-d$_6$): δ 40.82, 51.79, 68.48, 124.64, 128.36, 123.20, 133.12, 136.42, 158.99. HRMS (ESI+) calculated for C$_{10}$H$_{11}$BrNO$_2$ 255.9968. found 255.9968.

Alternative Procedure for Process Intermediate 8

Process 2, Steps A and B: (R)-2-Bromophenylalanine (170.1 g, 0.7 mol) and THF (1.7 L) are combined, cooled to about 5° C., and NaBH$_4$ (63.3 g, 1.7 mol) is added in portions to maintain the temperature at less than 5° C. A solution of I$_2$ (176.9 g, 0.7 mol) in THF (510 mL) is added to the mixture slowly, maintaining the internal reaction temperature at less than 10° C. The reaction mixture is warmed to RT and heated to 45° C. with stirring for 30 min. MeOH (134.0 g, 4.2 mol) is added dropwise to the reaction mixture. The resulting mixture is concentrated via distillation until the internal temperature reaches 68° C. at 700 Torr. To the reaction mixture is added THF (238 mL), aqueous KOH (85% KOH: 46.0 g, 0.7 mol and water: 150 mL) and toluene (1.7 L). The biphasic mixture is stirred at 83° C. for 4 h, and the resulting mixture is washed with 20% aqueous NaCl (3×400 mL). The organic phase is concentrated at 90° C. under 200 Torr.

To the resulting concentrated mixture, K$_2$CO$_3$ (9.7 g, 69.7 mmol) and diethyl carbonate (330.8 g, 2.8 mol) are added. The resulting mixture is stirred and EtOH is distilled at reflux temperature (bath temperature 145° C., inner temperature 124° C.) under atmospheric pressure for 3.5 h. The mixture is diluted with isopropyl acetate (850 mL), washed with water (3×350 mL), and concentrated at 120° C. under 50 Torr to give a slurry of white solids. To the slurry is added isopropyl acetate (340 mL) at 70° C. giving a homogeneous mixture, and heptane (510 mL) is added slowly to the clear solution to crystallize the product. The resulting slurry is cooled to −10° C., stirred for 1 h, and the resulting solid is collected by filtration. The solids are dried at 50° C. under 20 Torr to afford the title compound (Process 2, compound 9; 151.8 g, 85% yield) with 94.4% ee by chiral HPLC (Daicel CHIRALPAK® IC, 4.6 mm×150 mm, 5 u; mobile phases: 80/20 hexane/EtOH; injection volume: 2 μL; column temperature: 35° C.; wavelength: 220 nm.; flow rate: 1.0 mL/min). t$_R$=10.12.

Process Intermediate 9

(4R)-3-[(1S)-1-(benzenesulfonyl)ethyl]-4-[(2-bromophenyl)methyl]oxazolidin-2-one

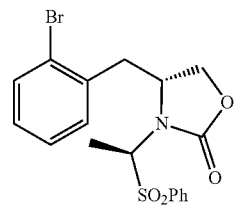

Process 2, Step C: (4R)-4-[(2-bromophenyl)methyl]oxazolidin-2-one (17.5 g, 64.9 mmol) is combined with sodium benzenesulfinate (12.1 g, 71.4 mmol), water (87.5 mL), MeOH (8.75 mL), formic acid (20.1 mL) and acetaldehyde (18.5 mL, 325.0 mmol) in a reactor vessel. The vessel is sealed and the reaction mixture is heated to 75° C. with stirring. After 40 h, the reaction mixture cooled to RT over 2.5 h with stirring. The reactor is unsealed and the resulting crystalline white solids are collected by filtration, washed sequentially with water (2×50 mL) and hexanes (2×50 mL), and dried in a vacuum oven at 50° C. for 48 h to obtain the title compound (Process 2, compound 10, 26.3 g, 95% yield) with >99% ee by chiral HPLC (Daicel CHIRALPAK® IC-3, 4.6 mm×150 mm, 3μ, mobile phases: 3:2 H$_2$O:ACN; injection volume: 2 μL; column temperature: 25° C.; wavelength: 220 nm; flow rate: 1.5 mL/min). t$_R$=17.85 min. Achiral HPLC t$_R$=7.7 min. The absolute stereochemistry of (R)-4-(2-bromobenzyl)-3-((S)-1-(phenylsulfonyl)ethyl)oxazolidin-2-one is confirmed by single crystal X-Ray analysis. $^1$H NMR (600 MHz, DMSO-d$_6$): δ 1.77 (d, J=7.3 Hz, 3H), 2.81 (dd, J=13.5, 10.7 Hz, 1H), 3.22 (dd, J=13.5, 3.8 Hz, 1H), 4.00 (dd, J=8.9, 2.5 Hz, 1H), 4.05 (m, 1H), 4.45 (m, 1H), 5.24 (q, J=7.2 Hz, 1H), 7.22 (td, J=7.7, 1.7 Hz, 1H), 7.36 (td, J=7.5, 1.3 Hz, 1H), 7.43 (dd, J=7.6, 1.7 Hz, 1H), 7.77 (t, J=7.3 Hz, 1H), 7.63 (td, J=8.0, 1.4 Hz, 3H), 7.90 (d, J=8.5 Hz, 2H). $^{13}$C{1H} NMR (151 MHz, DMSO-d$_6$): δ 12.30, 39.70, 52.63, 66.83, 70.33, 124.66, 128.56, 129.36, 129.80, 130.06, 132.98, 133.33, 135.12, 135.66, 136.55, 156.80. HRMS (ESI+) calculated for C$_{18}$H$_{19}$BrNO$_4$S 424.0213. found 424.0211.

Single crystal X-ray analysis: A clear colorless rod-like specimen of C$_{18}$H$_{18}$BrNO$_4$S, approximate dimensions 0.010 mm×0.010 mm×0.150 mm, grown by dissolution in hot toluene, followed by a slow cooling crystallization technique, is used for the X-ray crystallographic analysis. The X-ray intensity data are measured (λ=1.54178 Å). A total of 5711 frames are collected. The total exposure time is 15.9 h. The frames are integrated with the Bruker SAINT software package using a narrow-frame algorithm. The integration of the data using a monoclinic unit cell yields a total of 11348 reflections to a maximum θ angle of 72.47° (0.81 Å resolution), of which 3314 are independent (average redundancy 3.424, completeness=97.3%, R$_{int}$=5.77%, R$_{sig}$=5.18%) and 3067 (92.55%) are greater than 2σ (F$^2$). The final cell constants of a=11.5479 (esd=16) Å$^3$, b=5.7655(esd=9) Å, c=14.537(esd=2) Å, β=110.348(esd=5)°, volume=907.5 (esd=2) Å$^3$, are based upon the refinement of the XYZ-centroids of 8561 reflections above 20 σ(I) with 6.484°<2θ<144.5°. Data are corrected for absorption effects using the Multi-Scan method (SADABS). The ratio of minimum to maximum apparent transmission is 0.716. The calculated minimum and maximum transmission coefficients (based on crystal size) are 0.5610 and 0.9580.

The structure is solved and refined using the Bruker SHELXTL Software Package, using the space group P 1 2$_1$ 1, with Z=2 for the formula unit, C$_{18}$H$_{18}$BrNO$_4$S. The final anisotropic full-matrix least-squares refinement on F$^2$ with 252 variables converged at R1=7.83%, for the observed data and wR2=22.06% for all data. The goodness-of-fit is 1.142. The largest peak in the final difference electron density synthesis is 0.738 e-/Å$^3$ and the largest hole is −0.638 e-/Å$^3$ with an RMS deviation of 0.078 e-/Å$^3$. On the basis of the final model, the calculated density is 1.553 g/cm$^3$ and F(000), 432 e-. The flack parameter observed is −0.03(5), suggesting that the stereo centers are assigned correctly. The results of the single crystal X-ray analysis confirms the stereochemistry shown above for Process Intermediate 9, (4R)-3-[(1S)-1-(benzenesulfonyl)ethyl]-4-[(2-bromophenyl)methyl]oxazolidin-2-one.

Alternative Procedure for Process Intermediate 9

(4R)-4-[(2-bromophenyl)methyl]oxazolidin-2-one (100 g, 0.5 mol), sodium benzenesulfinate (86 g, 0.5 mol), water (500 mL), formic acid (115 mL) and acetaldehyde (95.6 g, 2.2 mol) are charged into a 1 L autoclave. The resulting mixture is heated to 60° C. and stirred for 24 h. The resulting slurry is cooled to 35° C., and the resulting solids are collected by filtration. The collected solids are washed with water (100 mL) and dried at 50° C. under 20 Torr to afford the title compound (157.5 g, 95% yield) as a single enantiomer and diastereomer.

Process Intermediate 10

(5 S,10aR)-9-bromo-5-methyl-1,5,10,10a-tetrahydro-3H-oxazolo[3,4-b]isoquinolin-3-one

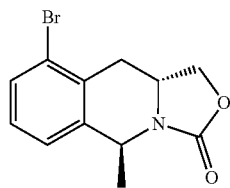 [SMILES: C[C@H]1c2cccc(Br)c2C[C@@H]2COC(=O)N21]

Process 2, Step D: (4R)-3-[(1S)-1-(benzenesulfonyl)ethyl]-4-[(2-bromophenyl)methyl]oxazolidin-2-one (10.0 g, 23.5 mmol) is slurried in DCM (100 mL) and the resulting mixture cooled to 2° C. Zirconium(IV) chloride (9.6 g, 41.1 mmol) is added to the mixture. After 1.5 h of stirring at 2° C., the reaction mixture is warmed to about 10° C. Water (50 mL) is added, and an aqueous solution of 50 wt % NaOH is added to pH ~13 with temperature rise to about 20° C. Diatomaceous earth (20 g) is added to the resulting slurry with rapid mixing. The slurry is filtered over diatomaceous earth with the aid of water and DCM and the resulting filter cake is rinsed with DCM. The resulting filtrate mixture is separated, the organic phase is washed twice with water (2×50 mL), and the organic phase is dried over Na$_2$SO$_4$, filtered, and concentrated under reduced pressure to give the title compound (Process 2, compound 11, 6.4 g, 93% yield; 54:1 dr) as a white crystalline solid in >99% ee by chiral HPLC (Daicel CHIRALPAK® IC-3, 4.6 mm×150 mm, 3μ, mobile phases: 3:2 H$_2$O:ACN; injection volume: 2 μL;

column temperature: 25° C.; wavelength: 220 nm; flow rate: 1.5 mL/min). t$_R$=19.38 min. The absolute stereochemistry of the title compound is confirmed by single crystal X-Ray analysis. $^1$H NMR (600 MHz, DMSO-d$_6$) δ 1.41 (d, J=6.8 Hz, 3H), 2.57 (dd, J=16.6, 10.4 Hz, 1H), 3.11 (dd, J=16.6, 4.6 Hz, 1H), 4.14 (ddt, J=10.4, 8.1, 4.6 Hz, 1H), 4.19 (dd, J=8.4, 5.3 Hz, 1H), 4.53 (t, J=8.1 Hz, 1H), 4.84 (q, J=6.8 Hz, 1H), 7.17 (t, J=7.8 Hz, 1H), 7.33 (d, J=7.8 Hz, 1H), 7.51 (d, J=7.9 Hz, 1H). $^{13}$C{1H} NMR (151 MHz, DMSO-d$_6$): δ 22.14, 34.43, 47.27, 48.21, 68.75, 125.26, 127.10, 128.52, 131.19, 131.88, 140.34, 156.25. HRMS (ESI+) calculated for C$_{12}$H$_{13}$BrNO$_2$ 282.0124. found 282.0127.

Single crystal X-ray analysis: A clear colorless rods-like specimen of C$_{12}$H$_{12}$BrNO$_2$, approximate dimensions 0.100 mm×0.400 mm×0.700 mm, grown from a mixture of toluene and heptane using a vapor diffusion crystallization technique, are used for the X-ray crystallographic analysis. The X-ray intensity data are measured (λ=1.54178 Å). A total of 9218 frames are collected. The total exposure time was 25.61 h. The frames are integrated with the Bruker SAINT software package using a narrow-frame algorithm. The integration of the data using a monoclinic unit cell yields a total of 84492 reflections to a maximum θ angle of 66.99° (0.84 Å resolution), of which 8122 are independent (average redundancy 10.403, completeness=100.0%, R$_{int}$=5.93%, R$_{sig}$=2.77%) and 7897 (97.23%) are greater than 2 σ (F$^2$). The final cell constants of a=15.5606(esd=6) Å, b=8.3186 (esd=3) Å, c=19.5153(esd=7) Å, β=112.7990(esd=10)°, volume=2328.74(esd=15) Å$^3$, are based upon the refinement of the XYZ-centroids of 9449 reflections above 20 σ (I) with 4.912°<2θ<156.3°. Data are corrected for absorption effects using the Multi-Scan method (SADABS). The ratio of minimum to maximum apparent transmission is 0.503. The calculated minimum and maximum transmission coefficients (based on crystal size) are 0.138 and 0.651.

The structure is solved and refined using the Bruker SHELXTL Software Package, using the space group P 1 2$_1$ 1, with Z=8 for the formula unit, C$_{12}$H$_{12}$BrNO$_2$. The final anisotropic full-matrix least-squares refinement on F$^2$ with 582 variables converged at R1=5.54%, for the observed data and wR2=18.74% for all data. The goodness-of-fit is 1.641. The largest peak in the final difference electron density synthesis is 0.988 e-/Å$^3$ and the largest hole is −1.512 e-/Å$^3$ with an RMS deviation of 0.102 e-/Å$^3$. On the basis of the final model, the calculated density was 1.609 g/cm$^3$ and F(000), 1136 e-. The flack parameter observed is 0.116 (esd=5), suggesting that the stereo centers are assigned correctly. The results of the single crystal X-ray analysis confirms the stereochemistry shown above for Process Intermediate 10, (5S,10aR)-9-bromo-5-methyl-1,5,10,10a-tetrahydro-3H-oxazolo[3,4-b]isoquinolin-3-one.

Alternative Procedure for Process Intermediate 10

(4R)-3-[(1S)-1-(benzenesulfonyl)ethyl]-4-[(2-bromophenyl)methyl] oxazolidin-2-one (144.2 g; 339.9 mmol) is combined with DCM (4325 mL) and the resulting mixture cooled to −10° C. Zirconium(IV) chloride (154.0 g; 660.8 mmol) is added in four portions (38.5 g each) at −10° C. and the resulting mixture is stirred for 2 h. Water (721 mL) and 28% aqueous NH$_3$ (721 mL) are added slowly to the reaction mixture. The aqueous phase is separated, and the organic phase is washed with water (721 mL). The organic phase is dried over Na$_2$SO$_4$ (306.9 g) and filtered. The filtrate is concentrated at 50° C. under 50 Torr and the resulting white solid is dried at 50° C. under 20 Torr to afford the title compound (91.6 g, 95.5% yield, 124:1 dr).

Process Intermediate 11

(E)-4-((1S,3R)-3-(hydroxymethyl)-1-methyl-1,2,3,4-tetrahydroisoquinolin-5-yl)-2-methylbut-3-en-2-ol

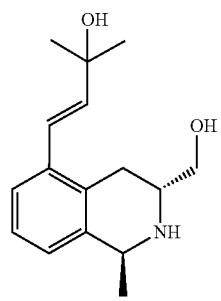 [SMILES: C[C@@H]1N[C@@H](CO)Cc2c(/C=C/C(C)(C)O)cccc21]

Process 2, Steps E and F: (5S,10aR)-9-bromo-5-methyl-1,5,10,10a-tetrahydro-3H-oxazolo[3,4-b]isoquinolin-3-one (6.0 g, 20.7 mmol) is combined with 2-methyl-3-buten-2-ol (9.75 mL, 93.0 mmol) and TEA (4.32 mL; 31.0 mmol) at RT and the resulting white slurry is degassed with a subsurface sparge of nitrogen for 10 min with stirring. Tri-o-tolylphosphine (786 mg, 2.58 mmol) and Pd(OAc)$_2$ (232 mg; 1.03 mmol) are added to the reaction mixture with continued degassing for 3 minutes. The nitrogen is switched from degassing to positive pressure on the head space and the resulting mixture is heated to 75° C. for 6.0 h. At 75° C., EtOH (30 mL) and 50 wt % NaOH (10.9 mL, 207 mmol) are added to the reaction mixture and the resulting mixture is stirred at 75° C. for 2.5 h. The reaction mixture is cooled to RT, the solids are filtered and washed with EtOH, and the wash is combined with the filtrate. The resulting filtrate mixture is concentrated under reduced pressure. Toluene, water, and saturated aqueous citric acid are added to the resulting residue. The aqueous phase is separated and washed with toluene. The aqueous phase is adjusted to pH ~13 with 50 wt % NaOH and extracted with DCM. The organic phase is dried over Na$_2$SO$_4$ and concentrated under reduced pressure. The resulting residue is dissolved in hot isopropyl acetate (6 mL) and heptane (6 mL) and a few seed crystals of (E)-4-((1S,3R)-3-(hydroxymethyl)-1-methyl-1,2,3,4-tetrahydroisoquinolin-5-yl)-2-methylbut-3-en-2-ol are added to give a thick slurry. Heptane (24 mL) is added slowly to the slurry while cooling to RT with stirring for 48 h. The resulting slurry is filtered, the collected solids are washed with heptane, and dried in a vacuum oven at 60° C., to give the title compound (Process 2, compound 12, 5.0 g; 89% yield) as a white solid. $^1$H NMR (600 MHz, DMSO-d$_6$): δ 1.25 (s, 6H), 1.31 (d, J=6.8 Hz, 3H), 2.13 (br, 1H), 2.24 (dd, J=16.4, 10.1 Hz, 1H), 2.67 (dd, J=16.4, 4.2 Hz, 1H), 3.06 (m, 1H), 3.39 (dd, J=10.3, 6.6 Hz, 1H), 3.46 (dd, J=10.3, 5.1 Hz, 1H), 4.08 (q, J=6.8 Hz, 1H), 4.62 (br, 1H), 4.69 (s, 1H), 6.17 (d, J=15.8 Hz, 1H), 6.66 (d, J=15.8 Hz, 1H), 6.95 (d, J=7.6 Hz, 1 Hz), 7.05 (t, J=7.6 Hz, 1H), 7.21 (d, J=7.8 Hz, 1H). $^{13}$C{$^1$H} NMR (151 MHz, DMSO-d$_6$): δ 24.25, 29.57, 125.59, 30.60, 30.63, 48.90, 50.52, 65.77, 69.91, 122.48, 123.25, 126.02, 131.95, 136.51, 141.21, 141.39. HRMS (ESI+) calculated for C$_{16}$H$_{24}$NO$_2$ 262.1802. found 262.1799.

Alternative Procedure for Process Intermediate 11

Deoxygenated 2-methyl-3-buten-2-ol (109.9 g, 1.3 mol), Pd(OAc)$_2$ (318.3 mg, 1.4 mmol) and tri-o-tolylphosphine (2.2 g, 7.2 mmol) are combined and the mixture is stirred at 16° C. for 30 min. To the mixture, (5S,10aR)-9-bromo-5-methyl-1,5,10,10a-tetrahydro-3H-oxazolo[3,4-b]isoquinolin-3-one (80 g, 283.6 mmol) and deoxygenated TEA (43 g, 424.9 mmol) are added. The resulting mixture is heated to reflux for 5 h. The reaction mixture is cooled to RT. Ethanol (400 mL) and 50 wt % aqueous NaOH (226.8 g, 2.8 mol) are added to the reaction mixture. The resulting mixture is heated to 75° C. and stirred for 3 h. The reaction mixture is cooled to RT and filtered. The filtrate is concentrated at 50° C. under 80 Torr. Toluene (400 mL), water (400 mL) and saturated aqueous citric acid (640 mL) are added to the concentrated residue. The organic phase is separated, and the aqueous phase is washed with toluene (400 mL). 50 wt % aqueous NaOH (400 mL) is added slowly to the aqueous phase. The basified aqueous mixture is extracted with isopropyl acetate (2×800) and the combined organic phases are dried over Na$_2$SO$_4$ (160.0 g) and filtered. The filtrate is concentrated at 50° C. under 50 Torr and the resulting residue is dissolved in isopropyl acetate (320 mL) at 60° C. The resulting mixture is cooled to 37° C. Heptane (1040 mL) is added to the resulting slurry at RT. The slurry is cooled to −10° C., stirred for 1 h, and the resulting solids are collected by filtration. The collected solids are washed with heptane (160 mL) and dried at 50° C. under 20 Torr to afford the title compound (68.6 g, 92% yield).

Process Intermediate 12

4-[(1S,3R)-3-(hydroxymethyl)-1-methyl-1,2,3,4-tetrahydroisoquinolin-5-yl]-2-methylbutan-2-ol

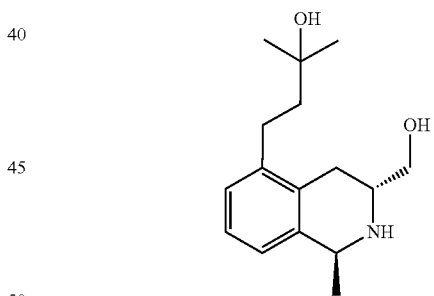

Process 2, Step G: Under nitrogen, (E)-4-((1S,3R)-3-(hydroxymethyl)-1-methyl-1,2,3,4-tetrahydroisoquinolin-5-yl)-2-methylbut-3-en-2-ol (50 g, 191.3 mmol), 5% Pd/C (1.1 g wet weight) and EtOH (250 mL) are combined in an autoclave, purged with nitrogen, and the system is replaced with hydrogen at 145 psig. The resulting mixture is stirred at RT for 4 h under 145 psig of hydrogen. The reaction mixture is filtered over a bed of diatomaceous earth and concentrated at 50° C. under 50 Torr. The resulting solids are collected by filtration and suspended and stirred in isopropyl acetate (200 mL) at RT for 1 h. Heptane (200 mL) is added dropwise, and the resulting slurry is cooled to −10° C. and stirred for 1 h. The resulting solids are collected by filtration, washed with heptane (100 mL), and dried at 50° C. under 20 Torr to afford the title compound (Process 2, compound 13, 46.2 g, 92% yield) as a white solid >99% ee by chiral HPLC (Daicel CHIRALPAK® AD-H, 4.6 mm×250 mm; 5µ; mobile phases: 0.1% ethanolamine in ACN; injection volume: 2 µL; column temperature: 35° C.; wavelength: 220 nm; flow rate: 1.5 mL/min). $t_R$=4.43 min. $^1$H NMR (600 MHz, DMSO-$d_6$): δ 1.13 (s, 6H), 1.31 (d, J=6.8 Hz, 3H), 1.57-1.45 (m, 2H), 2.08 (s, 1H), 2.21 (dd, J=16.3, 10.1 Hz, 1H), 2.52 (t, J=8.7 Hz, 2H), 2.64 (dd, J=16.3, 4.1 Hz, 1H), 3.06 (tt, J=10.4, 4.6 Hz, 1H), 3.37 (dd, J=10.3, 6.8 Hz, 1H), 3.46 (dd, J=10.5, 4.9 Hz, 1H), 4.07 (q, J=6.7 Hz, 1H), 4.21 (s, 1H), 4.63 (s, 1H), 6.89 (d, J=7.5 Hz, 1H), 6.91 (d, J=7.4 Hz, 1H), 7.00 (t, J=7.5 Hz, 1H). $^{13}$C{1H} NMR (151 MHz, DMSO-$d_6$): δ 24.36, 27.40, 28.87, 29.62, 29.68, 44.73, 49.13, 50.59, 65.79, 69.18, 124.66, 125.44, 126.24, 132.57, 141.20, 141.28. HRMS (ESI+) calculated for $C_{16}H_{26}NO_2$ 264.1958. found 264.1956.

D1 PAM I 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone

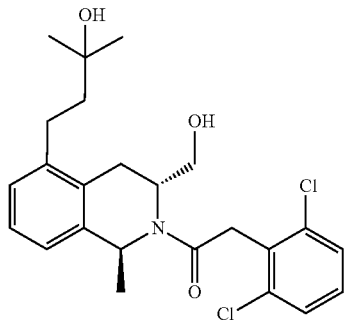 [SMILES: C[C@H]1c2cccc(CCC(C)(C)O)c2C[C@H](CO)N1C(=O)Cc1c(Cl)cccc1Cl]

Process 2, Step H: 2-Chloro-4,6-dimethoxy-1,3,5-triazine (14.7 g, 83.7 mmol) and ACN (400 mL) are combined, and 4-methylmorpholine (17.7 g, 175.0 mmol) is added at 0° C. The resulting mixture is stirred for 30 min, 2,6-dichlorophenylacetic acid (20.8 g, 101.4 mmol) is added, and the mixture is stirred at 0° C. for 1 h. 4-[(1S,3R)-3-(hydroxymethyl)-1-methyl-1,2,3,4-tetrahydroisoquinolin-5-yl]-2-methylbutan-2-ol (20 g, 75.9 mmol) and a mixture of $2CO_3$ (11.5 g, 83.7 mmol) in water (100 mL) are added to the mixture and stirred for 4 h at 0° C. The resulting layers are separated, and the organic phase is diluted with isopropyl acetate (100 mL) and saturated aqueous $NH_4Cl$ (100 mL). The resulting layers are separated, and the organic phase is washed with water (100 mL), dried over $Na_2SO_4$ (133.1 g), and filtered. The filtrate is concentrated at 50° C. under 80 Torr and the resulting mixture is dissolved in isopropyl acetate (80 mL). The resulting mixture is cooled to RT, heptane (80 mL) is added dropwise, and the resulting slurry is cooled to –10° C. with stirring for 1 h. The resulting solids are collected by filtration, washed with heptane (40 mL), and dried at 50° C. under 20 Torr to obtain the title compound (29.2 g, 85% yield) with >99% ee by chiral HPLC (Daicel CHIRALPAK® AD-H, 4.6 mm×250 mm, 5µ; mobile phases: 9:1 hexane:EtOH; injection volume: 2 µL, column temperature: 35° C.; wavelength: 220 nm; flow rate: 1.0 mL/min). $t_R$=14.03. MS (m/z): 451 (M+H).

Additional Procedure for D1 PAM I

Process 1, Step G: To a nitrogen inerted reactor is charged 2-chloro-4,6-dimethoxy-1,3,5-triazine (6.36 g, 36.2 mmol) and ACN (94 mL). The mixture is cooled to 0° C. and N-methylmorpholine (9.02 mL, 81.7 mmol) is added. After 20 min, 2-(2,6-dichlorophenyl)acetic acid (7.43 g, 36.2 mmol) is added, and the resulting mixture is stirred at 0° C. for 60 min. 4-[(1S,3R)-3-(Hydroxymethyl)-1-methyl-1,2,3,4-tetrahydroisoquinolin-5-yl]-2-methylbutan-2-ol (9.36 g, 35.5 mmol) slurried in ACN (81 mL) and THF (25 mL) is added. The resulting mixture is stirred at 0° C. for 22 h. The reaction mixture is filtered and the filter cake is washed with isopropyl acetate (100 mL). The resulting filtrate is concentrated under reduced pressure to less than 150 mL. The resulting mixture is diluted with isopropyl acetate (200 mL) and washed with a 1:1 mixture of water/saturated aqueous $NH_4Cl$ (3×50 mL). The combined organic extracts are washed sequentially with water (50 mL), saturated aqueous $NaHCO_3$ (50 mL), saturated aqueous NaCl, and dried over $Na_2SO_4$. The resulting mixture is filtered and the filtrate is concentrated under reduced pressure to ~100 mL. The solvent is removed by vacuum distillation at 60° C. to a volume of about 50 mL, and 50 mL of isopropyl acetate is added. The distillation and solvent exchange is repeated twice more. Seed crystals of 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone (50 mg) are added, the resulting slurry is stirred at RT for 21 h, and cooled to 0° C. in an ice water bath for 2 h. The resulting solids are collected by filtration. The filter cake is washed with 1:1 mixture of heptane/isopropyl acetate (15 mL) and dried under vacuum to afford the title compound (12.5 g, 78% yield) as a white solid. MS (m/z): 450 (M+H). Chiral HPLC $t_R$=8.48 min (<99% ee).

Procedure for Co-Crystal Formation of D1 PAM I with 4-Hydroxybenzoic Acid

D1 PAM I (11.5 g, 25.5 mmol) is combined with 4-hydroxybenzoic acid (Aldrich, 3.6 g, 26.0 mmol) in THF (28.8 mL) in a 100 mL round-bottomed flask with magnetic stirring. The resulting mixture is heated at 50° C. until all material is dissolved. The solution is filtered through a 0.45 µm syringe filter into a 250 mL 3-necked round bottom flask with overhead stirring, a nitrogen inlet, thermocouple, and addition port. The transfer and filtration are completed by rinsing with additional THF (4.6 mL). The filtered solution is heated to 50° C. until all components are dissolved, and heptane (18.4 mL) is added immediately. Seed crystals of the co-crystal (75 mg) are added and the mixture stirred at 50° C. for 30 min. Additional heptane (48.3 mL) is added via syringe pump over 8 h. The resulting slurry is allowed to cool to RT and is stirred for 12 h. The resulting solids are collected by filtration and washed sequentially with a 1:2 mixture of THF:heptane (23 mL) and a 5:95 mixture of THF/heptane (23 mL). The filtered solids are dried under vacuum to afford the title compound as a white solid (13.5 g, 90% yield). MS (m/z): 450 (M+H).

X-Ray Powder Diffraction (XRPD)

The XRPD patterns of crystalline solids are obtained on a Bruker D4 Endeavor X-ray powder diffractometer, equipped with a CuKa source (λ=1.54060 Å) and a Vantec detector, operating at 35 kV and 45 mA. The sample is scanned between 4 and 40° in degrees 2θ, with a step size of 0.03° in 2θ and a scan rate of 0.5 seconds/step, and with 0.6 mm divergence, 5.28 fixed anti-scatter, and 9.5 mm detector slits. The dry powder is packed on a zero-background quartz sample holder and a smooth surface is obtained using a glass slide. The crystal form diffraction patterns are collected at ambient temperature and relative humidity. It is well known in the crystallography art that, for any given crystal form, the relative intensities of the diffraction peaks may vary due to preferred orientation resulting from factors such as crystal morphology and habit. Where the effects of preferred orientation are present, peak intensities are altered, but the characteristic peak positions of the polymorph are unchanged. See, e.g., The United States Pharmacopeia #23, National Formulary #18, pages 1843-1844, 1995. Furthermore, it is also well known in the crystallography art that for any given crystal form the angular peak positions may vary slightly. For example, peak positions can shift due to a variation in the temperature or humidity at which a sample is analyzed, sample displacement, or the presence or absence of an internal standard. In the present case, a peak position variability of ±0.2 in 2θ will take into account these potential variations without hindering the unequivocal identification of the indicated crystal form. Confirmation of a crystal form may be made based on any unique combination of distinguishing peaks (in units of °2θ), typically the more prominent peaks. The crystal form diffraction patterns, collected at ambient temperature and relative humidity, are adjusted based on NIST 675 standard peaks at 8.853 and 26.774 degrees 2θ.

A sample of the co-crystal of D1 PAM I with 4-hydroxybenzoic acid is characterized by an XRD pattern using CuKa radiation as having diffraction peaks (2θ values) as described in Table 2 below, and in particular having peaks at 7.0° in combination with one or more of the peaks selected from the group consisting of 15.0°, 16.1°, and 21.0°; with a tolerance for the diffraction angles of 0.2 degrees.

TABLE 2

X-ray powder diffraction peaks of the crystalline compound of Co-Crystal D1 PAM I with 4-hydroxybenzoic acid

| Peak | Angle (° θ) +/− 0.2° | Relative Intensity (% of most intense peak) |
| --- | --- | --- |
| 1 | 7.0 | 100% |
| 2 | 15.0 | 31.8% |
| 3 | 16.1 | 35.3% |
| 4 | 17.4 | 20.3% |
| 5 | 18.2 | 29.9% |
| 6 | 19.8 | 17.2% |
| 7 | 20.3 | 17.6% |
| 8 | 21.0 | 33.1% |
| 9 | 21.3 | 23.3% |
| 10 | 25.2 | 20.9% |
| 11 | 25.5 | 21.4% |

We claim:
1. A process for preparing a co-crystal of compound of the formula:

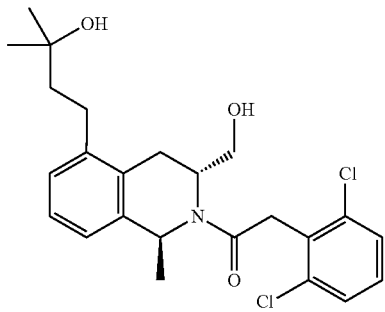 [SMILES: C[C@H]1c2cccc(CCC(C)(C)O)c2C[C@H](CO)N1C(=O)Cc1c(Cl)cccc1Cl]

comprising the steps of:
i.) Sequential treatment of (R)-2-bromophenylalanine with a reducing agent and iodine; and subsequent treatment with a mild mineral base and an alkyl carbonate to obtain (4R)-4-[(2-bromophenyl)methyl] oxazolidin-2-one;
ii.) Treatment of (4R)-4-[(2-bromophenyl)methyl] oxazolidin-2-one with a sodium arylsulfinate and acetaldehyde to obtain (4R)-3-[(1S)-1-(arylsulfonyl)ethyl]-4-[(2-bromophenyl)methyl] oxazolidin-2-one;
iii.) Optionally crystallizing the (4R)-3-[(1S)-1-(arylsulfonyl)ethyl]-4-[(2-bromophenyl)methyl] oxazolidin-2-one;
iv.) Optionally verifying the stereochemistry of (4R)-3-[(1S)-1-(arylsulfonyl)ethyl]-4-[(2-bromophenyl) methyl] oxazolidin-2-one by single crystal X-ray analysis;
v.) Pictet-Spengler cyclization of (4R)-3-[(1S)-1-(arylsulfonyl)ethyl]-4-[(2-bromophenyl)methyl] oxazolidin-2-one with a transition metal halide, to obtain (5S,10aR)-9-bromo-5-methyl-1,5,10,10a-tetrahydro-3H-oxazolo [3,4-b] isoquinolin-3-one;
vi.) Optionally crystallizing the (5S,10aR)-9-bromo-5-methyl-1,5,10,10a-tetrahydro-3H-oxazolo [3,4-b] isoquinolin-3-one;
vii.) Optionally verifying the stereochemistry of (5S, 10aR)-9-bromo-5-methyl-1,5,10,10a-tetrahydro-3H-oxazolo [3,4-b] isoquinolin-3-one by single crystal X-ray analysis;
viii.) Heck coupling of (5S,10aR)-9-bromo-5-methyl-1,5,10,10a-tetrahydro-3H-oxazolo [3,4-b] isoquinolin-3-one with 2-methyl-3-buten-2-ol to obtain (E)-4-((1S, 3R)-3-(hydroxymethyl)-1-methyl-1,2,3,4-tetrahydroisoquinolin-5-yl)-2-methylbut-3-en-2-ol;
ix.) Optionally crystallizing the (E)-4-((1S,3R)-3-(hydroxymethyl)-1-methyl-1,2,3,4-tetrahydroisoquinolin-5-yl)-2-methylbut-3-en-2-ol;
x.) Reduction of (E)-4-((1S,3R)-3-(hydroxymethyl)-1-methyl-1,2,3,4-tetrahydroisoquinolin-5-yl)-2-methylbut-3-en-2-ol under hydrogenation conditions to obtain 4-[(1S,3R)-3-(hydroxymethyl)-1-methyl-1,2,3,4-tetrahydroisoquinolin-5-yl]-2-methylbutan-2-ol;
xi.) Optionally crystallizing 4-[(1S,3R)-3-(hydroxymethyl)-1-methyl-1,2,3,4-tetrahydroisoquinolin-5-yl]-2-methylbutan-2-ol;
xii.) Coupling of 4-[(1S,3R)-3-(hydroxymethyl)-1-methyl-1,2,3,4-tetrahydroisoquinolin-5-yl]-2-methylbutan-2-ol with 2,6-dichlorophenylacetic acid in the presence of a coupling agent for amide synthesis and a non-nucleophilic organic base to obtain 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone;
xiii.) Optionally crystallizing 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl] ethanone; and
xiv.) Treating 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone with 4-hydroxybenzoic acid to obtain a co-crystal of 2-(2,6-dichlorophenyl)-1-[(1S,3R)-3-(hydroxymethyl)-5-(3-hydroxy-3-methyl-butyl)-1-methyl-3,4-dihydro-1H-isoquinolin-2-yl]ethanone with 4-hydroxybenzoic acid.
2. The compound (5S,10aR)-9-bromo-5-methyl-1,5,10, 10a-tetrahydro-3H-oxazolo[3,4-b]isoquinolin-3-one.

3. The compound of claim 2 which is crystalline.

4. The compound (E)-4-((1S,3R)-3-(hydroxymethyl)-1-methyl-1,2,3,4-tetrahydroisoquinolin-5-yl)-2-methylbut-3-en-2-ol.

5. The compound of claim 4 which is crystalline.

6. A process for preparing the compound of claim 2, comprising a diastereoselective Pictet-Spengler cyclization of (4R)-3-[(1S)-1-(benzenesulfonyl)ethyl]-4-[(2-bromophenyl)methyl]oxazolidin-2-one with $ZrCl_4$ to obtain (5S,10aR)-9-bromo-5-methyl-1,5,10,10a-tetrahydro-3H-oxazolo[3,4-b]isoquinolin-3-one.

7. A process of claim 6 wherein the diastereomeric ratio achieved is greater than 50:1.

8. The process of claim 1, wherein the reactions are performed using flow reaction methodology.

9. The process of claim 1, wherein the reactions are performed using batch processing methodology.

\* \* \* \* \*